United States Patent [19]

Matsuura

[11] Patent Number: 4,548,287

[45] Date of Patent: Oct. 22, 1985

[54] COMBINATION WEIGHING MACHINE WITH VIBRATORY FEEDING AND COLLECTING HOPPER

[75] Inventor: Yoshikazu Matsuura, Tokyo, Japan

[73] Assignee: Teraoka Seiko Co., Ltd., Tokyo, Japan

[21] Appl. No.: 518,632

[22] Filed: Jul. 29, 1983

[30] Foreign Application Priority Data

| Jul. 31, 1982 | [JP] | Japan | 57-117632[U] |
| Jul. 31, 1982 | [JP] | Japan | 57-117633[U] |
| Oct. 29, 1982 | [JP] | Japan | 57-164887[U] |
| Oct. 30, 1982 | [JP] | Japan | 57-192283 |
| Jan. 31, 1983 | [JP] | Japan | 58-14343 |
| Jan. 31, 1983 | [JP] | Japan | 58-14340 |
| Jan. 31, 1983 | [JP] | Japan | 58-14342 |
| Feb. 28, 1983 | [JP] | Japan | 58-31926 |
| Apr. 30, 1983 | [JP] | Japan | 58-65951[U] |

[51] Int. Cl.⁴ .................................. G01G 19/22
[52] U.S. Cl. ........................... 177/25; 177/128; 177/162; 198/580
[58] Field of Search ............ 177/25, 162, 50, DIG. 6, 177/DIG. 11, DIG. 12, 128, 110; 198/580, 445, 446, 370, 609; 222/460, 462, 564; 366/336, 337, 340; 310/78, 92

[56] References Cited

U.S. PATENT DOCUMENTS

| 832,400 | 10/1906 | Lyons | 366/336 X |
| 2,131,034 | 9/1938 | Beck | 177/110 |
| 2,460,605 | 2/1949 | Soissa | 366/336 X |
| 2,556,661 | 6/1951 | Rendall et al. | 222/564 X |
| 2,833,393 | 5/1958 | Kay | 198/580 X |
| 3,117,639 | 1/1954 | Dreeben | 177/DIG. 11 X |
| 3,785,534 | 1/1974 | Smith | 222/460 |
| 3,799,280 | 3/1974 | Aarts | 177/121 X |
| 3,841,471 | 10/1974 | Mead | 198/580 X |
| 4,398,612 | 8/1983 | Mikami et al. | 177/25 |
| 4,415,048 | 11/1983 | Teraoka | 177/25 X |
| 4,421,185 | 12/1983 | Koto et al. | 177/25 |
| 4,444,283 | 4/1984 | Mikami | 177/128 X |
| 4,448,272 | 5/1984 | Keller et al. | 177/25 X |

FOREIGN PATENT DOCUMENTS

| 0075479 | 9/1982 | European Pat. Off. | 177/25 |
| 1214017 | 11/1970 | United Kingdom | 222/462 |

Primary Examiner—E. A. Goldberg
Assistant Examiner—Fred L. Kampe
Attorney, Agent, or Firm—Watson Cole Grindle & Watson

[57] ABSTRACT

A measuring apparatus for measuring various kinds of products irregular in weight such as vegetables and fruits, confectionery, secondary processed goods, perishable foods and the like with constant qualities. According to the invention, the apparatus comprises a distributing table supplied with the products to be measured, feeding troughs arranged about the distributing table to form a plurality of branched passages for the product, pool hoppers and measuring hoppers continuously connected to the respective troughs so as to permit the product on the distributing table to be introduced through the feeding troughs and the pool hoppers into the measuring hoppers, and computer means for selecting a combination of the measuring hoppers whose weight of product accommodated therein is equal or near to a set weight and opening the selected measuring hoppers to exhaust the measured product. The apparatus is remarkably improved in construction, particularly with respect to the transfer means for transferring the product through the apparatus.

20 Claims, 41 Drawing Figures

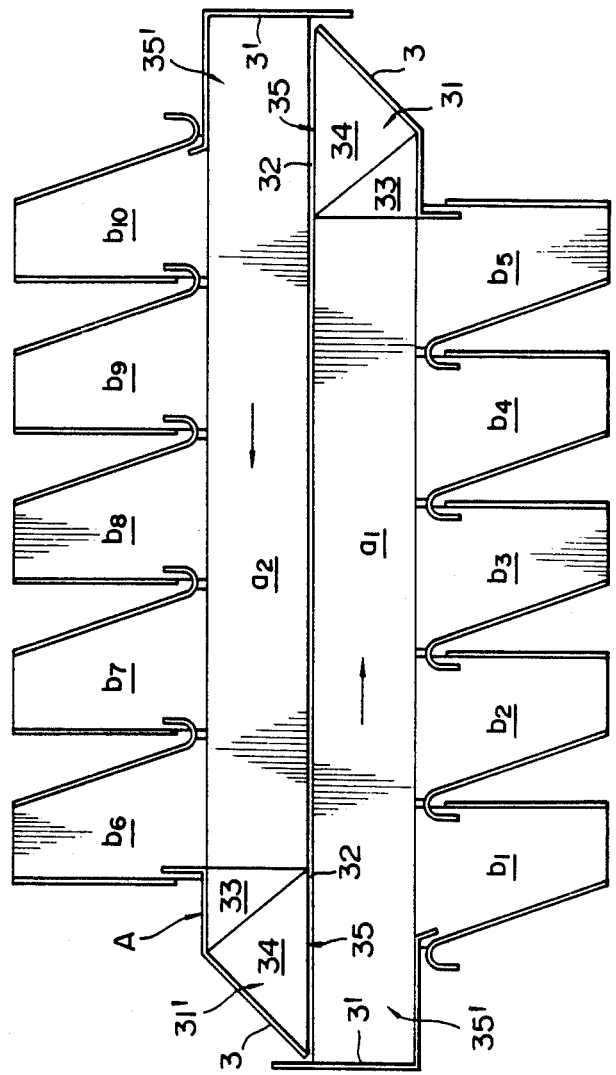

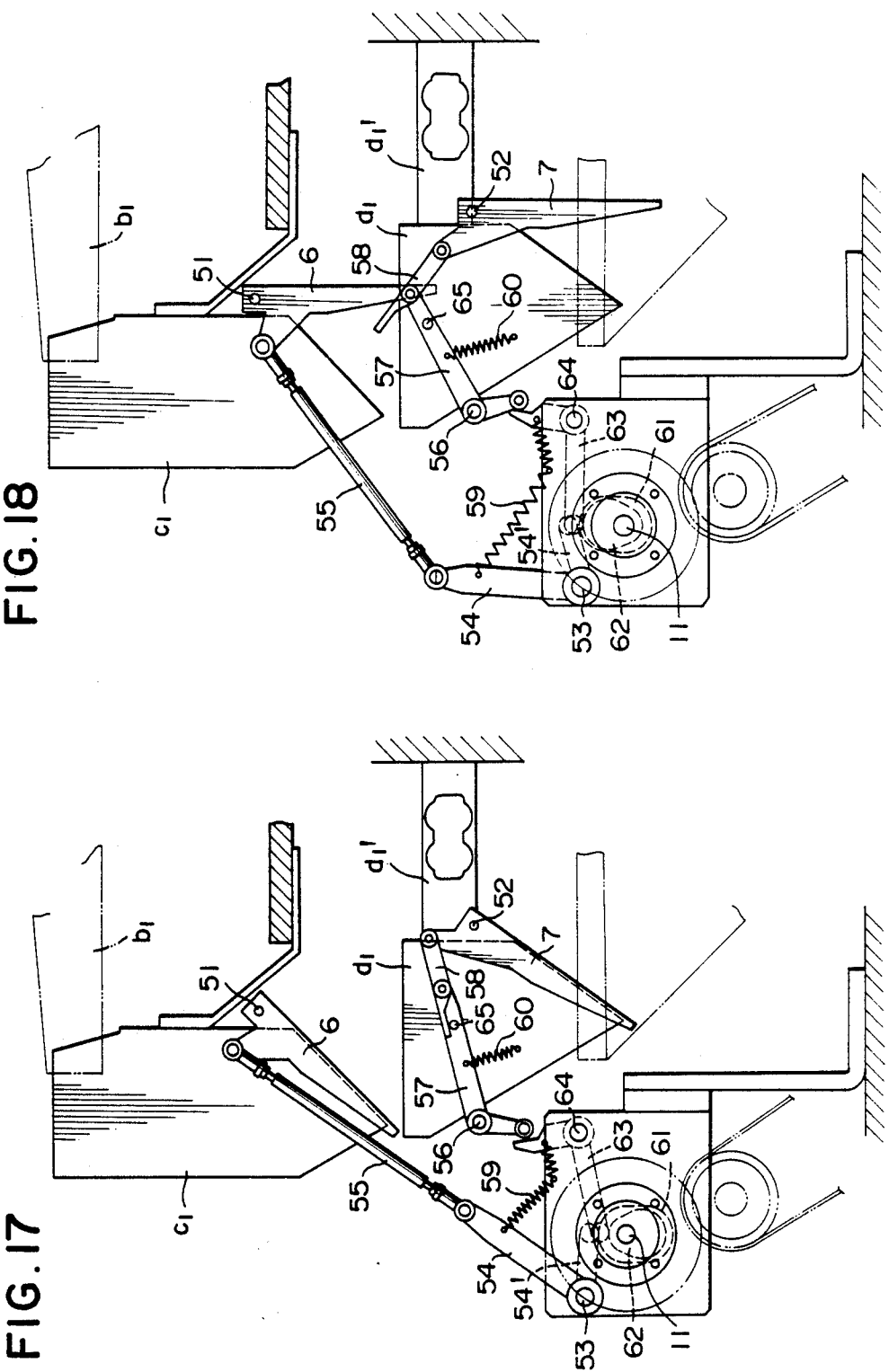

COMBINATION WEIGHING MACHINE WITH VIBRATORY FEEDING AND COLLECTING HOPPER

BACKGROUND OF THE INVENTION

1. Field of the Invention

This invention relates to a measuring apparatus, and more particularly to an improvement of a measuring apparatus, particularly improved in construction and comprising a distributing table supplied with product to be measured, feeding troughs arranged about the distributing table to form a plurality of branched passages, pool hoppers and measuring hoppers continuously connected to the respective troughs for introducing the product on the distributing table through the feeding troughs and the pool hoppers into the measuring hoppers, and computer means for selecting a combination of the measuring hoppers whose weight of product accommodated therein is equal or near to a set weight to open the selected measuring hoppers so as to exhaust the measured product.

2. Description of the Prior Art

As disclosed in Japanese Unexamined Utility Model Publications (Kokai) Nos. 56-142331 and 57-52631, a measuring apparatus of this kind, hitherto used, includes in general a conical disc-shaped distributing table, a plurality of feeding troughs radially arranged about the distributing table, and pool hoppers and measuring hoppers continuously connected to the respective troughs.

With the above construction, however, as the distributing table is in the form of a conical disc, the two adjacent troughs arranged about the distributing table form respective sector-shaped dead spaces or ineffective spaces therebetween which make it impossible for the apparatus to made small-sized. Moreover, as the respective feeding troughs are arranged in angularly different directions, opening and closing mechanisms and other mechanisms for the pool hoppers and measuring hoppers continuously connected to the respective carrying-in troughs must be separately or independently designed resulting in complicated constructions. Furthermore, exhaust openings of the troughs are remote from each other which make difficult cleaning and maintenance of the apparatus.

SUMMARY OF THE INVENTION

It is therefore a first object of the invention to provide an improved measuring apparatus which eliminates the above disadvantages in the prior art and is small-sized by minimizing ineffective spaces between troughs and easy to clean and maintain.

In order to accomplish this object, the measuring apparatus according to the invention comprises a distributing table composed of two elongated distributing plates which distribute product to be measured while being transferred in opposite directions with the aid of vibration, a plurality of feeding troughs arranged side-by-side in the transferring directions of the product and in parallel with each other perpendicular to the outer edges of the distributing plates, and pool hoppers and measuring hoppers continuously connected to exhaust ports of the feeding troughs.

It is a second object of the invention to simplify the opening and closing mechanism for bottom plates secured to respective hoppers to be freely opened and closed by arranging the pool hoppers and measuring hoppers in rows on the sides of the distributing plates.

It is a third object of the invention to improve means for supplying the product to be measured onto the distributing table in a manner such that the product is supplied onto two locations on the distributing table to eliminate any deviation of supplied product, while more product is supplied into measuring hoppers selected at a higher frequency and less product is supplied onto measuring hoppers selected at a lower frequency.

It is a fourth object of the invention to improve the distributing plates themselves so as to permit the product to smoothly transfer from the transfer terminal ends of one to the other distributing plate, thereby eliminating any local delay of the product to accomplish a smooth distributing operation.

It is a fifth object of the invention to uniformly transfer the product from the distributing plates to the respective troughs to avoid irregularities in the transferred amount of the product as much as possible.

It is a sixth object of the invention to improve the opening and closing mechanisms of pool hoppers and measuring hoppers whose bottom plates are connected through toggle mechanisms to driving units whose output is even small so as to securely open and close the bottom plates with low noise resulting from low closing speed of the bottom plates due to small closing clearances of the bottom plates.

It is a seventh object of the invention to improve a mounting construction of the pool hoppers and measuring hoppers such that hopper main bodies, bottom plates and their opening and closing mechanisms are separately constructed and the hopper main bodies are detachably mounted to a frame, thereby facilitating cleaning of the hoppers.

It is an eight object of the invention to enable a supply apparatus for the product to automatically regulate its supply conditions which determine the stored amount of the product on the distributing table, thereby easily and rapidly regulating the carried amount of the product into the measuring hoppers so as to maintain the optimum transfer conditions to improve the workability of the apparatus.

It is a ninth object of the invention to improve driving means for driving the product on the distributing plates and in the troughs to automatically regulate the transfer conditions of the driving means, thereby obtaining easy and rapid regulating operation to maintain the optimum transfer conditions of the product.

It is a tenth object of the invention to provide driving means for driving the product on the distributing plates and in the troughs, which are constructed by transfer feeders having oscillators to determine transfer conditions of the feeders by setting peak values and frequencies of the oscillators.

It is an eleventh object of the invention to provide an improved measuring apparatus with improved collecting hoppers for collecting at one location the product emitted from a selected plurality of measuring hoppers, such that the time required for the product emitted from the measuring hoppers to exhaust ports of the collecting hoppers is made uniform to improve the exhaust efficiency of the hoppers.

BRIEF DESCRIPTION OF THE DRAWINGS

FIG. 9 is a plan view of an improved modification of the distributing table;

FIG. 17 is a rear elevation illustrating enlarged parts of an opening and closing mechanism for a hopper;

FIG. 18 is a rear elevation similar to FIG. 17 but in opened condition;

DETAILED DESCRIPTION OF THE PREFERRED EMBODIMENT

Referring to FIGS. 1-8 illustrating a fundamental constrcution of the measuring apparatus according to the invention, the apparatus comprises a distributing table A, feeding troughs $B_1$ and $B_2$, pool hoppers $C_1$ and $C_2$, measuring hoppers $D_1$ and $D_2$, a measured product supply apparatus E for supplying product to be measured, a supply hopper F, and a collecting hopper G. This measuring apparatus measures, in constant quantity, various kinds of products irregular in weight such as vegetables and fruits, confectionery, secondary processed goods, perishable foods and the like.

Figure 1:
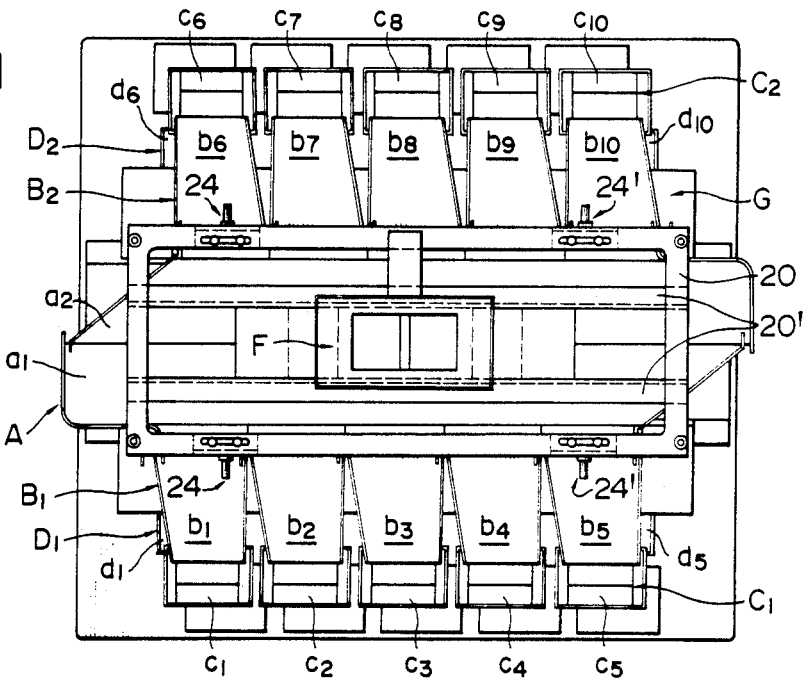
FIG. 1 is a plan view of a measuring apparatus according to the invention.
Figure 2:
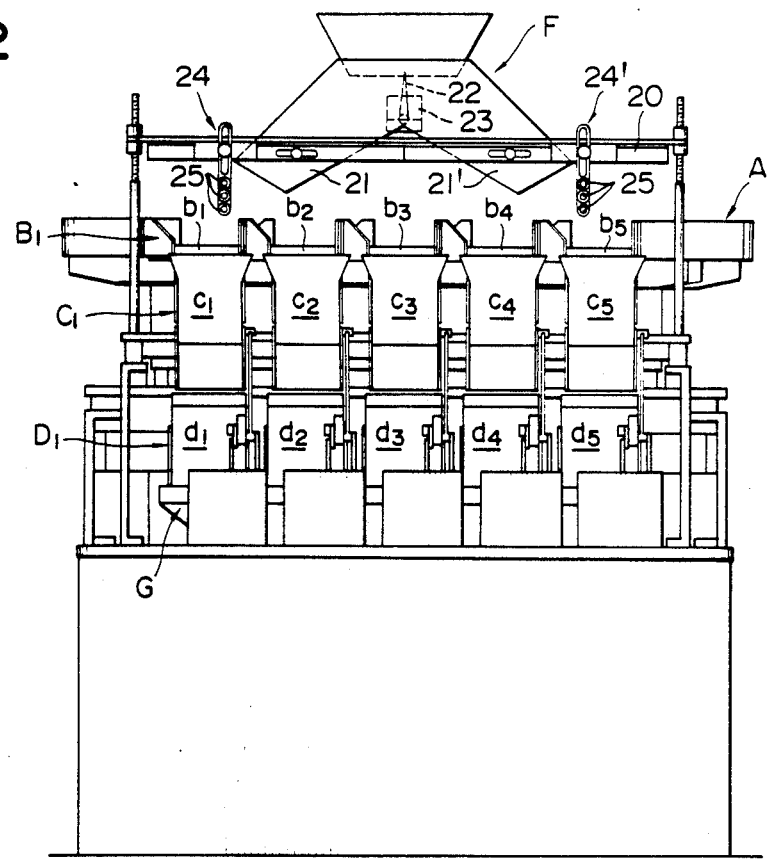
FIG. 2 is a side view of the apparatus shown in FIG. 1.
Figure 3:
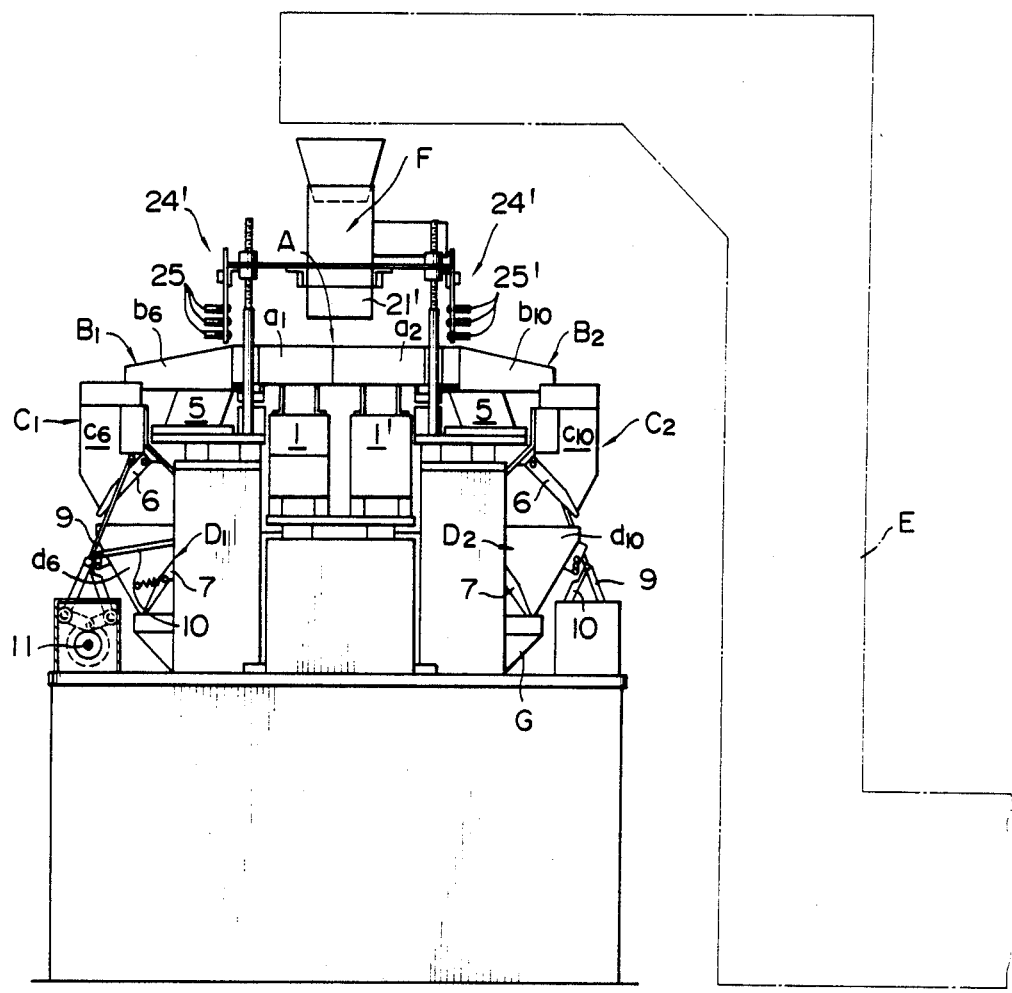
FIG. 3 is a rear elevation of the apparatus shown in FIG. 1.
Figure 4:
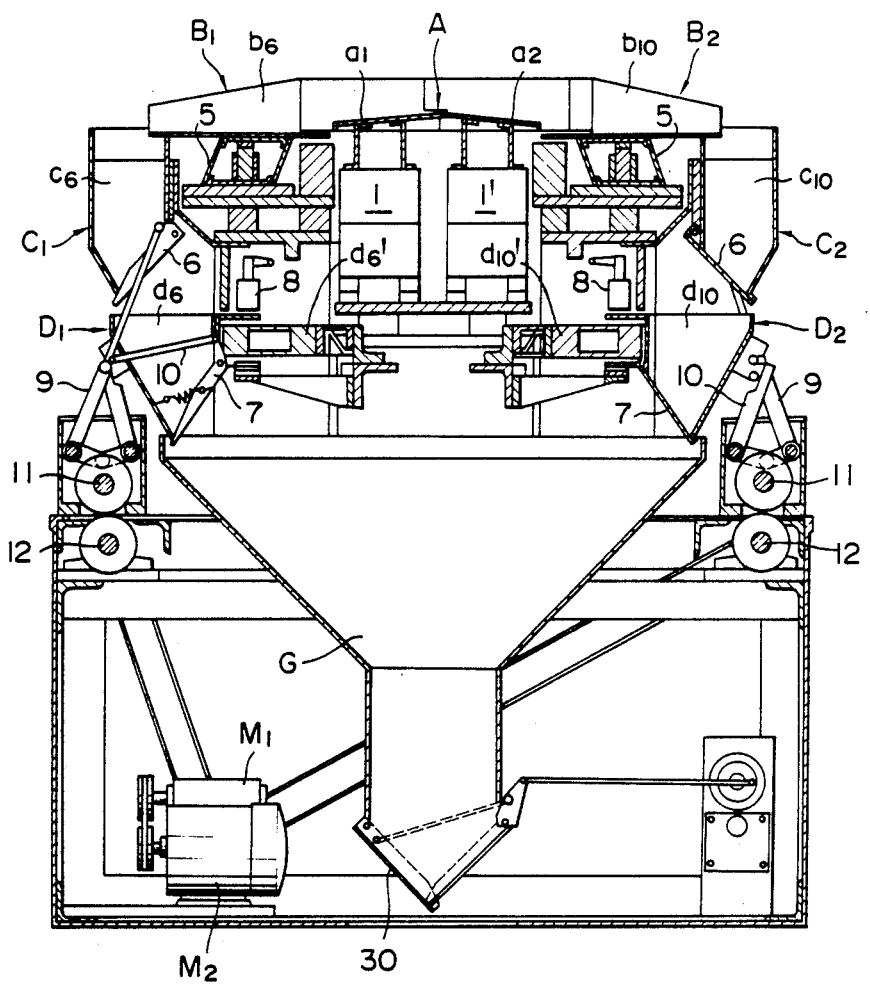
FIG. 4 is an enlarged sectional rear elevation of the apparatus shown in FIG. 1 after removal of a supply hopper and sensor portions.

The distributing table A comprises two elongated distributing plates $a_1$ and $a_2$ closely arranged in parallel with each other such that the adjacent edges of each distributing plate are slightly higher than both outer edges of the plates to form slight slopes in the form of a roof as shown in an upper portion of the apparatus in FIG. 4.

Figure 5:
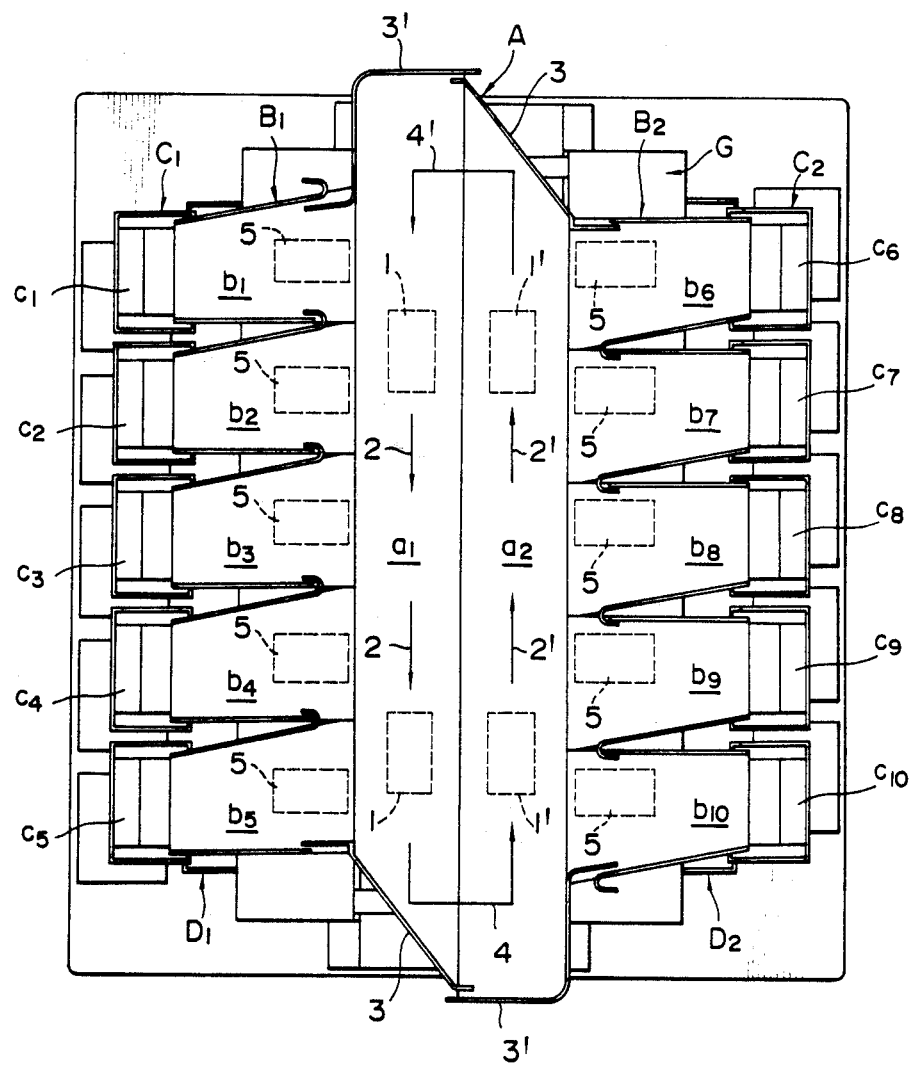
FIG. 5 is a plan view of the apparatus shown in FIG. 4.

Under the distributing plates $a_1$ and $a_2$ are arranged distributing feeders 1 and 1' comprising oscillators to transfer the product on the respective distributing plates $a_1$ and $a_2$ in directions shown by arrows 2 and 2' in FIG. 5. The transferring directions of the product on the distributing plates are opposite to each other as shown by the arrows 2 and 2' to transfer the product in opposite directions on the distributing plates.

The distributing plates $a_1$ and $a_2$ are provided at both ends with guide frame plates 3 and 3' standing upright from the distributing plates. The guide frame plates 3 at the transfer terminal ends of the distributing plates are angularly oblique to the transferring direction so that the product arriving at the transfer terminal ends is guided by the angularly oblique guide frame plates 3 so as to be smoothly transferred to the other distributing plate as shown in the directions shown by the arrows 4 and 4'. Accordingly, the product to be measured is circulated, while being distributed, in directions shown by arrows 2, 2' 4 and 4' in FIG. 5 on the distributing table A with the aid of vibration.

The feeding troughs $B_1$ and $B_2$ are arranged so as to be continuous to the respective outer edges of the distributing plates $a_1$ and $a_2$ to form a plurality of branched passages for the product to be measured. The feeding trough $B_1$ consists of five troughs $b_1$–$b_5$ and the other feeding trough $B_2$ consists of five troughs $b_6$–$b_{10}$. The above troughs $b_1$–$b_{10}$ are of the same construction. The troughs $b_1$–$b_5$ are arranged side-by-side in the longitudinal direction of the distributing plate $a_1$ adjacent to the outer longitudinal edge of the distributing plate $a_1$ and extend in parallel with each other perpendicular to the outer longitudinal edge of the distributing plate $a_1$. In the same manner, the troughs $b_6$–$b_{10}$ are arranged side-by-side in the longitudinal direction of the distributing plate $a_2$ adjacent to the outer longitudinal edge of the distributing plate $a_2$ and extend in parallel with each other perpendicular to the other longitudinal edge of the distributing plate $a_2$. Under the troughs $b_1$–$b_{10}$ are arranged feeders 5 comprising oscillators. The product transferred on the distributing plates $a_1$ and $a_2$ is received into inlets of the respective troughs with the aid of vibration of the oscillators to cause the product to advance on the troughs $b_1$–$b_{10}$ toward the pool hoppers $C_1$ and $C_2$.

Outwardly below the carrying-in troughs $B_1$ and $B_2$ are arranged pool hoppers $C_1$ and $C_2$, the pool hopper $C_1$ consisting of five pool hoppers $c_1$–$c_5$ corresponding to the feeding troughs $b_1$–$b_5$ and the pool hopper $C_2$ consisting of five pool hoppers $c_6$–$c_{10}$ corresponding to the feeding troughs $b_6$–$b_{10}$. The above pool hoppers $c_1$–$c_{10}$ are arranged so as to permit their upper openings to be located below the exhaust ports of the feeding troughs $b_1$–$b_{10}$ to transfer the product falling from the exhaust ports of the feeding troughs $b_1$–$b_{10}$ into the respective pool hoppers $c_1$–$c_{10}$ when the feeders 5 of the troughs $b_1$–$b_{10}$ are operated. The pool hoppers $c_1$–$c_{10}$ are provided at their lower end with bottom plates 6 to store the product transferred thereinto to be measured.

The measuring hoppers $D_1$ and $D_2$ are arranged immediately below the pool hoppers $C_1$ and $C_2$, the measuring hopper $D_1$ consisting of five measuring hoppers $d_1$–$d_5$ corresponding to the pool hoppers $c_1$–$c_5$, and the measuring hopper $D_2$ consisting of five measuring hoppers $d_6$–$d_{10}$ corresponding to the pool hoppers $d_6$–$d_{10}$. The above measuring hoppers $d_1$–$d_{10}$ are arranged so as to permit upper openings to be located immediately below the exhaust ports of the pool hoppers $c_1$–$c_{10}$ to receive therefrom the product stored therein, when the bottom plates 6 are opened. The measuring hoppers $d_1$–$d_{10}$ are provided at their lower ends with respective bottom plates 7 to be freely opening and closing, thereby temporarily storing the received product in the measuring hoppers $d_1$–$d_{10}$. The measuring hoppers $d_1$–$d_{10}$ are located in connection with respective measuring means $d_1'$–$d_{10}'$ which measure the weight or number of the product transferred into and stored in the measuring hoppers $d_1$–$d_{10}$.

The measured values data for the measuring hoppers $d_1$–$d_{10}$ are transmitted from the measuring means $d_1'$–$d_{10}'$ to the central processing unit (CPU) which selects a set of measuring hoppers (for example, the three hoppers $d_1$, $d_5$ and $d_7$) whose weight of the product is equal or near to the set weight, with the result that the bottom plates 7 of the selected measuring hoppers ($d_1$, $d_5$ and $d_7$) are opened to transfer the product in these measuring hoppers into the collecting hopper G. A reference numeral 8 in FIG. 4 denotes each weight provided at each measuring means $d_1'$–$d_{10}'$ for adjusting a zero point and a span.

Moreover, to each of the bottom plates 6 of the pool hoppers $c_1$–$c_{10}$ and to each of the bottom plates 7 of the measuring hoppers $d_1$–$d_{10}$ are connected opening and closing links 9 and 10 which are associated with a cam shaft 11 arranged on each side of the apparatus. Each cam shaft 11 is connected through magnetic clutches (not shown) to each of driving shafts 12. When magnetic clutches are timely energized, the rotation of the cam shafts 11 causes the selected bottom plates 6 and 7 to open and close through the links 9 and 10 at the appropriate time. The above driving shafts 12 are arranged outwardly below the measuring hoppers $D_1$ and $D_2$ in parallel with each other along the longitudinal directions of the distributing table A and are always rotatively driven by motors $M_1$ and $M_2$.

Figure 7:
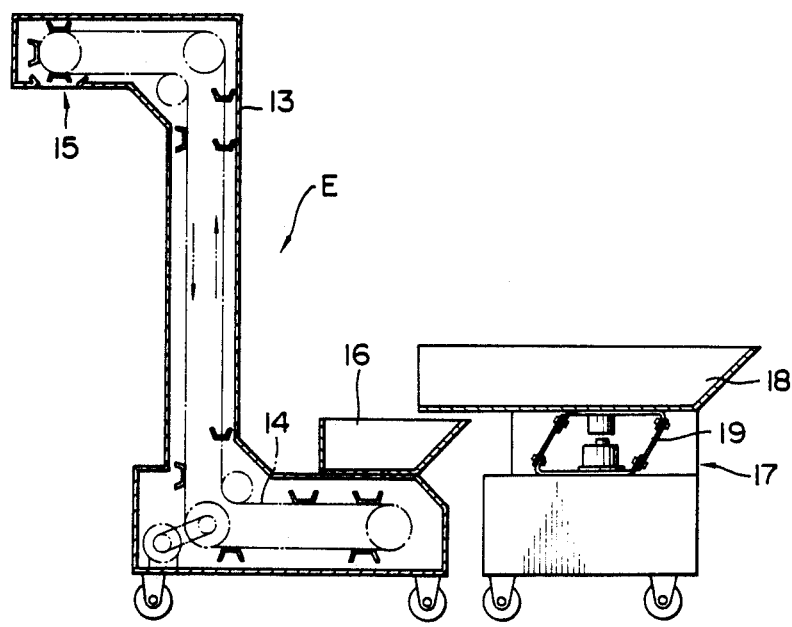
FIG. 7 is a sectional view of supply apparatus for supplying product to be measured onto the distributing table.

The supply apparatus E shown in FIG. 7 is provided with a pivoted bucket conveyor 14 rotatable within a frame 13. The frame 13 has a supply port 15 at the lower side of its upper end, and a hopper 16 on its rear part. A storing portion 18 of a supply machine 17 is positioned in a manner to be connected to the hopper 16, and a supply feeder 19 is provided below the storing portion 18.

In the operation of the supply apparatus E, when the supply feeder 19 is driven after the measured product is stored in the portion 18, the product is fed to the hopper direction due to the vibration of the feeder 19 and has successively fallen down into the hopper 16. The product is then conveyed by means of a bucket conveyor 14, and is supplied through the supply port 15 into a supply hopper F positioned over a distributing table A.

The supply hopper F is mounted to a mounting plate 20' fixed within a rectangular support frame 20 which, in turn, is provided on the distributing table A. The hopper receives measured products supplied from the supply apparatus E.

Figure 8:
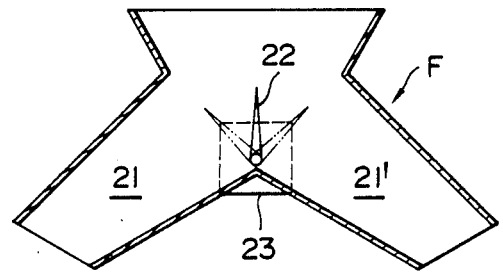
FIG. 8 is a sectional view of the supply hopper.

The lower port of the supply hopper F is forked so as to provide two supply ports 21, 21' in a manner that these ports are positioned over the distributing table A. A valve 22 is provided at the forked part so that it may be operated by a pulse motor 23 (FIG. 8).

When the valve 22 stands upright as shown in full line, the two ports 21, 21' passes the same amount of product. When the valve is rotated by the pulse motor 23 and is inclined to either side as shown by the dotted line, the supply amount of the inclined side port is reduced.

On the distributing table A, the product is piled up at the position below supply ports 21, 21'. In order to detect the piled height, sensors 24, 24' are provided at any desired position of the support frame 20.

The sensor 24, 24' consists of light-emitting elements 25 and light-receiving elements 25' confronting each other in several steps (combination of three steps is illustrated). The sensor detects the piled height of the product in three stages so that the position of the hopper valve 22 may be controlled.

That is, if the sensor 24, 24' of the middle step is set standard, the valve is maintained upright so that when the two sensors of middle step are off, the measured product is supplied uniformly to both of the two supply ports 21, 21', and when one of the sensors is on, the valve 22 is inclined by the pulse motor 23 so that a greater amount of the measured product is supplied through the supply port 21 or 21' of the on-sensor side.

If the upper step sensors 24, 24' are off, the product is excessively supplied, while if the lower step sensors are off, the product is not sufficiently supplied. Since these conditions are not normal, an engineer should be informed of it by means of buzzer, warning light etc.

In this instance, if the lower step sensors 24, 24' are off, it is possible to operate the supply apparatus E so as to start the supplying operation, and to stop the operation when the upper step sensors are off.

Figure 6:
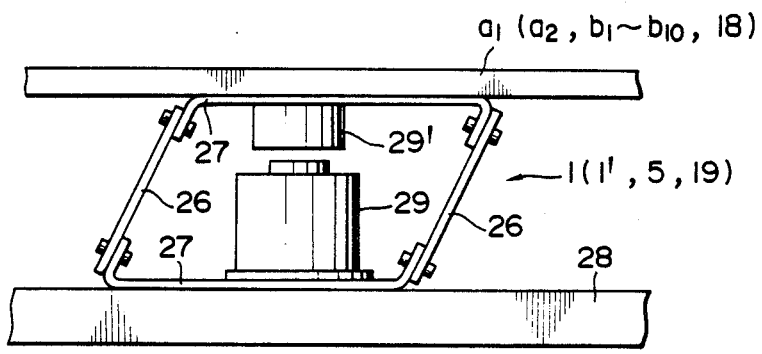
FIG. 6 is a side view of a transfer feeder for a distributing plate or a carrying-in trough.

FIG. 6 illustrates a structure consisting of distributing feeders 1, 1', a feeder 5 and a supply feeder 19. In the structure, plate springs 26, 26 are connected to a frame 28 and a distributing plate $a_1$ or $a_2$ (or troughs $b_1$–$b_{10}$ or storing portion 18) by means of mounting plates 27, 27. One of the mounting plates 27, 27 is provided with a vibrator magnet 29, while the other is provided with a movable member 29'. With this structure, the magnet 29 is driven by a driver mentioned later, so as to reciprocate the movable member 29' and thus to reciprocate the distributing plate $a_1$ for conveying product.

As shown in FIGS. 1 through 8, the measured product is suitably supplied from the supply apparatus E on to the distributing table A via the supply hopper F. The product is then fed while being distributed on the distributing plates $a_1$, $a_2$ as shown by arrows 2, 2', 4, 4' by distributing feeders 1, 1'. The feeders 5' of the feeding troughs $b_1$–$b_{10}$ stop while the measurd product is stored in all of the pool hoppers $c_1$–$c_{10}$. When one or more of the pool hoppers become(s) empty, troughs $b_1$–$b_{10}$ corresponding to the empty hoppers are driven for a certain time period so that the hoppers are filled while the troughs receive measured product from the distributing plates $a_1$, $a_2$.

Then bottom plates 6 of the empty pool hoppers only are opened and product is supplied in the corresponding measuring hoppers $d_1$–$d_{10}$. The weights of the product in the measuring hoppers are measured by measuring devices $d_1'$–$d_{10}'$. Hopper sets selected by a central processing unit (CPU) are operated to open their bottom plates 7 so that the product therein falls down into a collecting hoppers G. The total weight of the product in the collecting hopper G is approximately equal to the set weight and, in this way, the set weight product is successively obtained. The measured product collected in the collecting hopper is then discharged by the opening movement of the bottom plate 30, to a packing machine or conveying means connected to the machine. The measuring work is effected by repeating the process mentioned above.

In this instance, it should be noted that the dead space between adjacent feeding troughs $b_1$–$b_5$ or $b_6$–$b_{10}$ are extremely reduced and, accordingly, the size of the apparatus can be minimized because of the shape of the distributing table A consisting of two alongated distributing plates $a_1$, $a_2$, and to the design that the feeding troughs are provided at the external margin of the table A.

Further, pool hoppers $c_1$–$c_5$, $c_6$–$c_{10}$ and measuring hoppers $d_1$–$d_5$, $d_6$–$d_{10}$ are positioned side-by-side. Therefore, since the mechanisms for opening and closing bottom plates 6, 7 of these hoppers can be operated by driving shafts 12 at both sides, the structure of the apparatus of the invention can be simplified. In addition, the removal and maintenance of pool hoppers and measuring hoppers are easy. Moreover, the structure of providing sensors 24, 24' for controlling the valves of supply hoppers F for supplying measured product on the distributing table A, enables the product to be uniformly distributed on distributing plates and to minimize the disorder in the carried-in amounts in the feeding troughs $b_1$–$b_{10}$.

FIGS. 9 through 13 show various variations of the distributing table A. These varied embodiments include a structure in which transfer end terminals 35 of distributing plates $a_1$, $a_2$ are provided with guides 31, 31' for guiding measured product into the transfer start terminals 35' of the other distributing plates $a_2$, $a_1$.

This structure is provided for removing the inconveniences in which the product may not be moved smoothly from the end terminal 35 over the boundary edge 32 to the start terminal 35' of the other plate due to it that the distributing plates $a_1$, $a_2$ are formed inclined from the boundary edge 32, as has been explained.

These guides 31, 31', respectively, consist of the first and the second guide surfaces 33, 34. The second guide surface 34 is formed as a triangle of the same level as that of the boundary edge 32. The first guide surface 33 is formed inclined from the level of the second surface 34 and the upper surface of the distributing plates $a_1$ or $a_2$.

When the measured product reaches the transfer terminal 35, it ascends along the first guide surface 33 to the second guide surface. Then it is guided by a guide frame 3 and passes over the boundary edge 32. In this way, it is transferred smoothly to the transfer terminal 35' of the other distributing plate.

Figure 10:
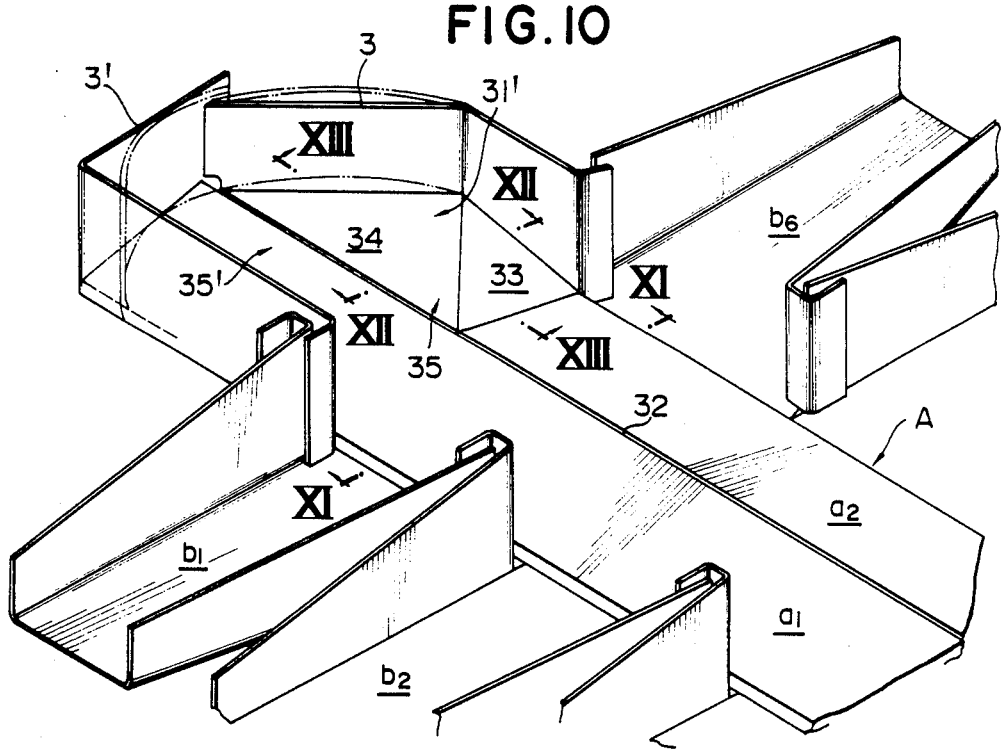
FIG. 10 is a perspective view of an important part of the distributing table shown in FIG. 9.
Figure 11:
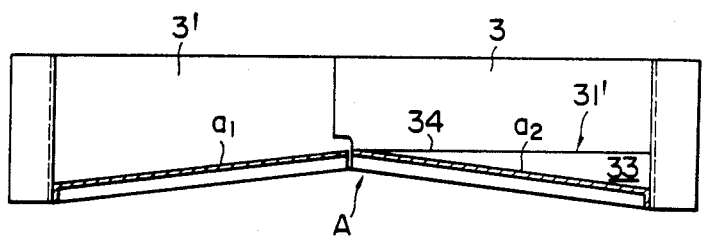
FIG. 11 is a sectional view taken along line XI—XI in FIG. 10.
Figure 12:
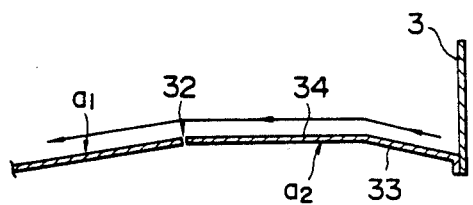
FIG. 12 is a sectional view taken along line XII—XII in FIG. 10.
Figure 13:
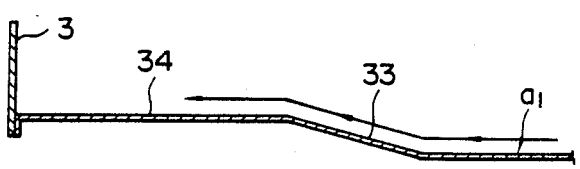
FIG. 13 is a sectional view taken along line XIII—XIII in FIG. 10.

In the drawings, although guide frames 3, 3' are shown straight, they may be curved as shown in dotted line in FIG. 10.

Figure 14:
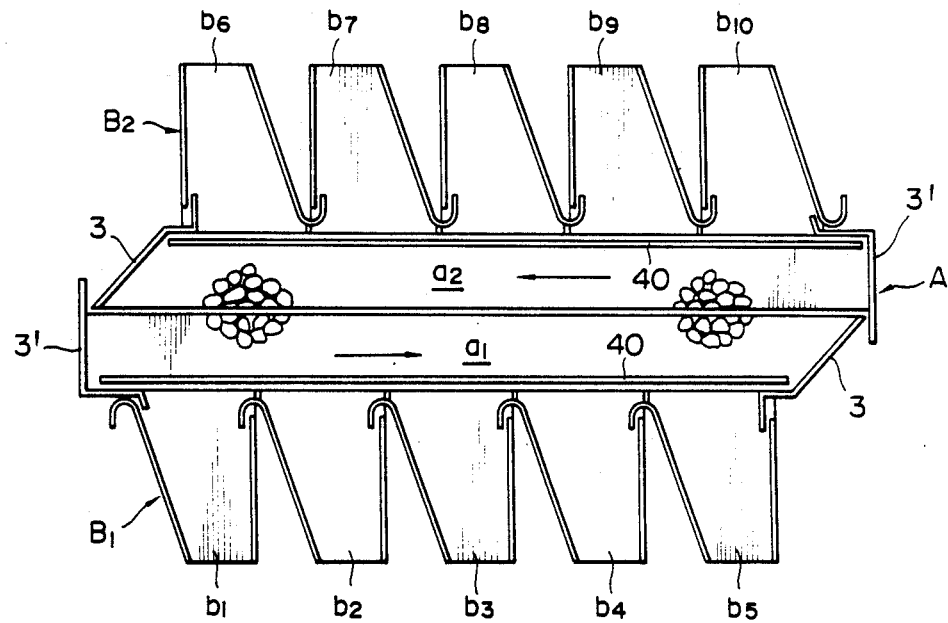
FIG. 14 is a plan view of a further improved modification of the distributing table.
Figure 15:
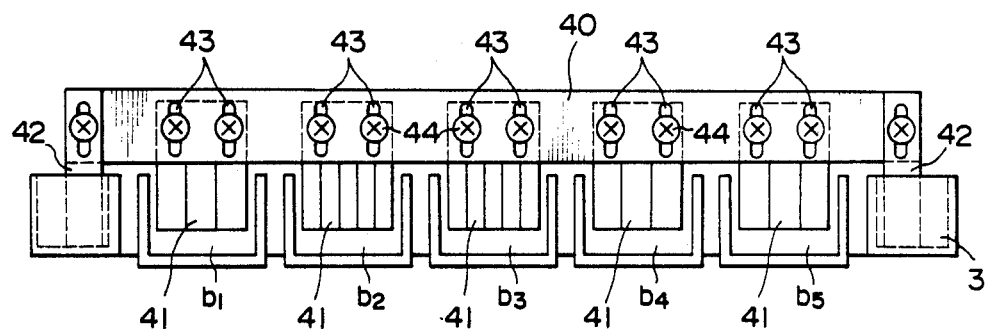
FIG. 15 is a side view of the distributing table shown in FIG. 14.
Figure 16:
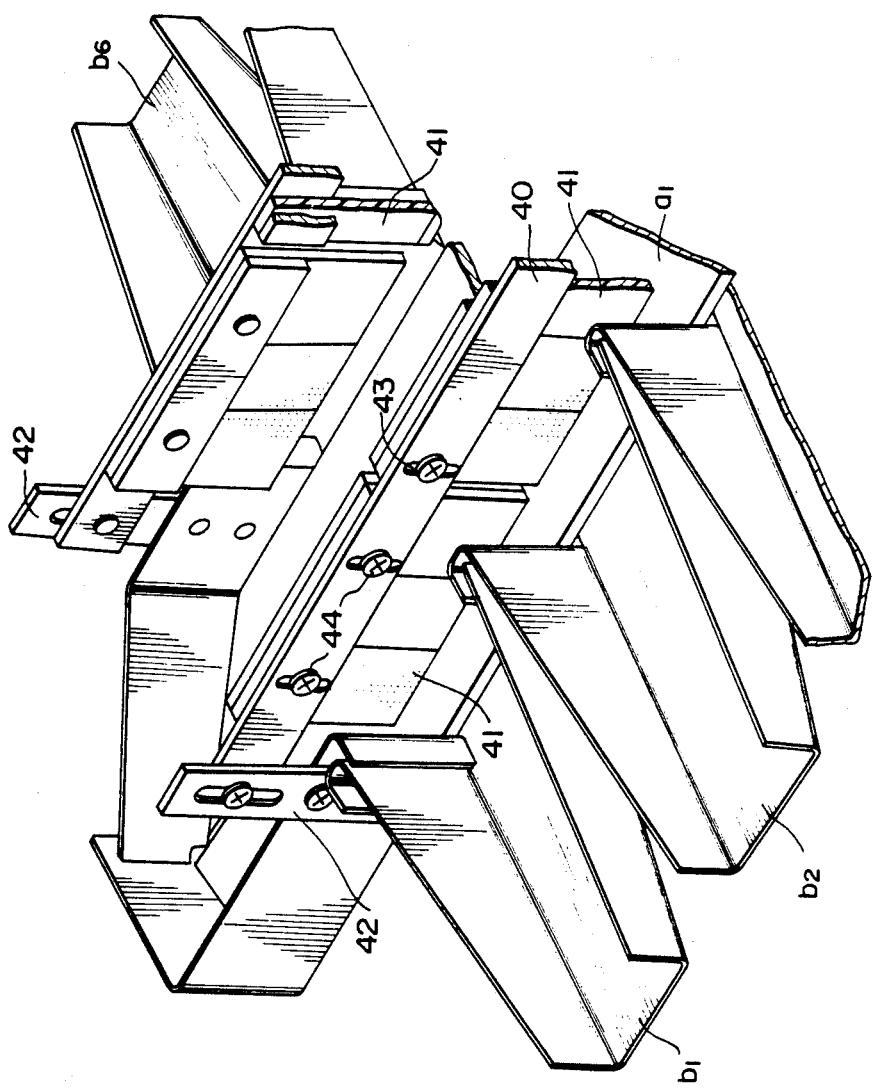
FIG. 16 is a perspective view of an important portion of the table shown in FIG. 16.

FIGS. 14 through 16 show another embodiment of the boundary portion between the distributing table A and the feeding trough $B_1$, $B_2$. The structure includes mounting plates 40, 40 mounted to side edges of distributing plates $a_1$, $a_2$, and control plates 41 extending from the mounting plates, for controlling the fed amount of the product.

The mounting plate 40 is supported by support columns 42, 42 provided on guide frames 3, 3', such that its mounted level is adjustably controlled along the columns 42, 42.

The control plate 41 is made of synthetic resin film or plate having a flexible property and its lower part is broken. The plate 41 is hung from the mounting plate 40 such that it faces to each other at respective inlet of carrying-in troughs $b_1$ through $b_{10}$. The plate 41 is mounted to the mounting plate 40 by means of fastening means with an elongated aperture in a manner that its level can be adjusted. The control panel 41 is positioned at the lower level for the carrying-in troughs $b_1$–$b_{10}$ through which excessive product amount is fed, so that the product amount passing between the plate 41 and the trough may be reduced, while the panel 41 is positioned at an upper level for the troughs which allow a smaller amount of measured products.

The total fed-in amount may be controlled by the height of the mounting plate 40 which is adjusted depending on the nature or kind of the measured product. In this way, the irregularity in the carried-in amount of the product through the troughs $b_1$–$b_{10}$ can be reduced.

FIGS. 17 through 18 illustrate the opening and closing mechanism of a pool hopper $c_1$, $c_2$ and a measuring hopper $d_1$, $d_2$. For brevity's sake, the following explanation is with respect to the pool hopper $c_1$ and the measuring hopper only, since the other hoppers are substantially the same as those explained.

To the pool hopper $c_1$, a bottom plate 6 is openably provided by means of a pivot shaft 51, while the measuring hopper $d_1$ is provided with an openable bottom plate 7 on a pivot shaft 52.

An L-shaped link 54 which rotates around a pivot shaft 53, is connected via a link 55 to the bottom plate 6 and, thus, a toggle mechanism is formed. Likewise another toggle mechanism is formed consisting of a L-shaped link 57 which rotates around a pivot shaft 56 and which is connected via a link 58 to the bottom plate 7.

The L-shaped link 54 or 57 is connected to a closing spring 59 or 60 respectively, so that the link 55 and the L-shaped link 54, or the link 58 and the L-shaped link 57, may be extended straight to close the bottom plate 6 or 7. That is, the closing spring 59, 60 acts as a driving part for closing the plate.

An elliptical cam 61 is engaged with or disengaged from a driven end 54' of the L-shaped link 54. The cam 61 is provided via an electro-magnetic clutch (not shown) on a cam shaft 11 driven by a motor M1. When the clutch is set to the "on" position, the elliptical cam 61 is rotated integral with the clutch and pushes the driven link 54' up, to open the bottom plate 6. That is, the cam 61 acts as a driving part for opening the plate 6.

Another cam 62 is engaged with or disengaged from an L-shaped intermediate link 63 which contacts an L-shaped link 57, and is mounted on the cam shaft 11 via an electro-magnet clutch (not shown). When the clutch is operated, the cam 62 is rotated and, thus, rotates the intermediate link 63. As the result, the L-shaped link 57 is pushed up and thus the bottom plate 7 is opened. The cam 62 acts, therefore, as the driving part for opening the plate.

In the embodiment mentioned above, the bottom plate 6 cooperates with the closing spring 59 by means of the two links 54, 55 which form a toggle mechanism. Therefore, even if the power of the spring 59 is not strong, a relatively heavy product may be contained in the pool hopper $c_1$. Further, since the spring power need not be extremely strong, the output of the motor M1 need not be strong even if a number of hoppers are provided. In addition, since the closing speed of the bottom plate 6 is low, noise is reduced when it closes and touches the measuring hopper $d_1$.

A similar advantageous effect is obtained for the bottom plate 7 as well. Since the two links 57, 58 forming a toggle mechanism of the plate 7, is constituted such that a stopper 65 is provided to the L-shaped link, the plate need not contact directly even when it closes and thus noise can be reduced to almost zero.

Figure 19:
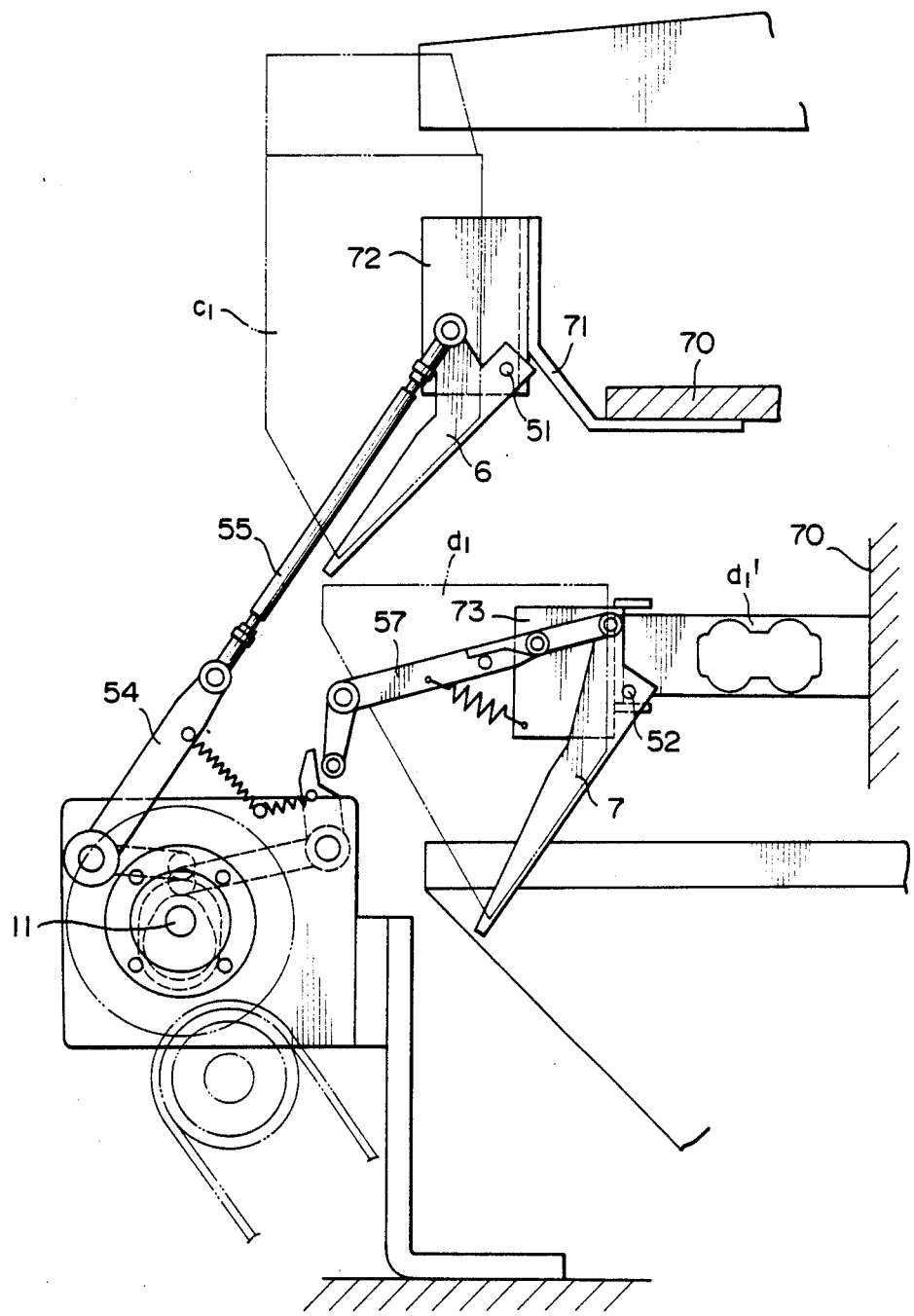
FIG. 19 is a rear elevation illustrating a modification of a mounting structure of a hopper.
Figure 20:
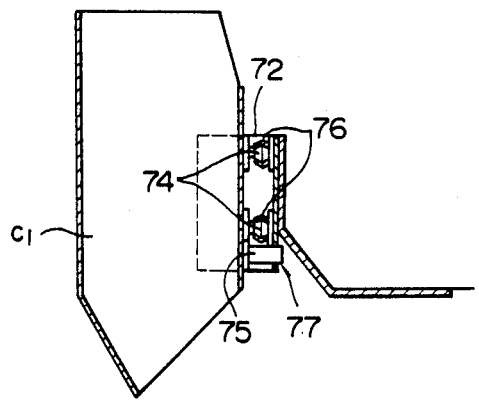
FIG. 20 is a sectional view showing a mounting structure of the pool hopper shown in FIG. 19.
Figure 21:
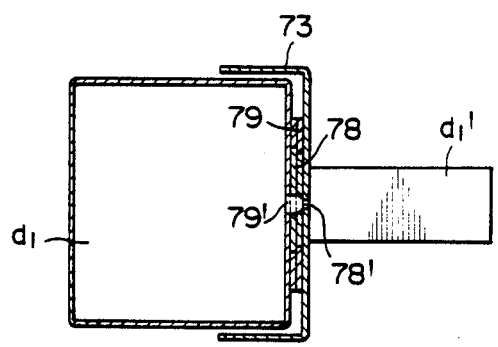
FIG. 21 is a sectional plan view of the mounting structure shown in FIG. 19.

FIGS. 19 through 21 illustrate varied embodiments of the mounting structure of the pool hoppers $c_1$, $c_2$ and the measuring hoppers $d_1$, $d_2$. An explanation is made only with respect to the pool hopper $c_1$ and the measuring hopper $d_1$, since the other hoppers are the same as those explained.

A frame 70 is provided with a mounting plate 72 via a support arm 71. To the plate 72, in turn, is removably mounted a pool hopper $c_1$, and a rotatable bottom plate 6 at a position of a pivot shaft 51. The bottom plate 6 is connected to the link 55 of an opening and closing mechanism as has been explained.

A measuring apparatus $d_1'$ is fixed at one end to the frame 70, and is provided with a mounting plate 73. To the plate 73 is removably mounted a measuring hopper $d_1$. Further, a bottom plate 7 is rotatably mounted to the plate 73 by means of a pivot shaft 52, and a link 58 of an opening and closing mechanism is connected to the plate 7.

FIG. 20 illustrates a mounting mechanism of the pool hopper $c_1$. The hopper is provided with male hooks or spigots 74 and guide pins 75, while the mounting plate 72 is provided with female hooks or sockets 76 and guide apertures 77 so that the hopper $c_1$ may be mounted to the plate 72 when the male and female hooks 74, 76 are engaged to each other and when the pins 75 are fitted into the apertures 77.

FIG. 21 represents a mounting structure of the measuring hopper $d_1$. A mounting plate 73 is provided with a T-shape male guide piece 78 which has a latch aperture 78'. Further, a female guide 79 of substantially T shaped groove projects from the back surface of the measuring hopper $d_1$, so that the guide piece 78 slides within the guide 79. In addition, a pin 79' is urged by a spring or like and projects from the center of the guide 79. The measuring hopper $d_1$ is mounted removably to the mounting plate 73 in such a manner that the guide 79 is fitted to the guide piece and that the pin 79' is put into the latch aperture 78'.

The pool hopper $c_1$ and the measuring hopper $d_1$ can be removed from mounting plates 72, 73 while the bottom plates 6, 7 and their opening and closing mechanism remain attached to the frame 70. This fact facilitates in washing the hoppers $c_1$, $d_1$.

Figure 22:
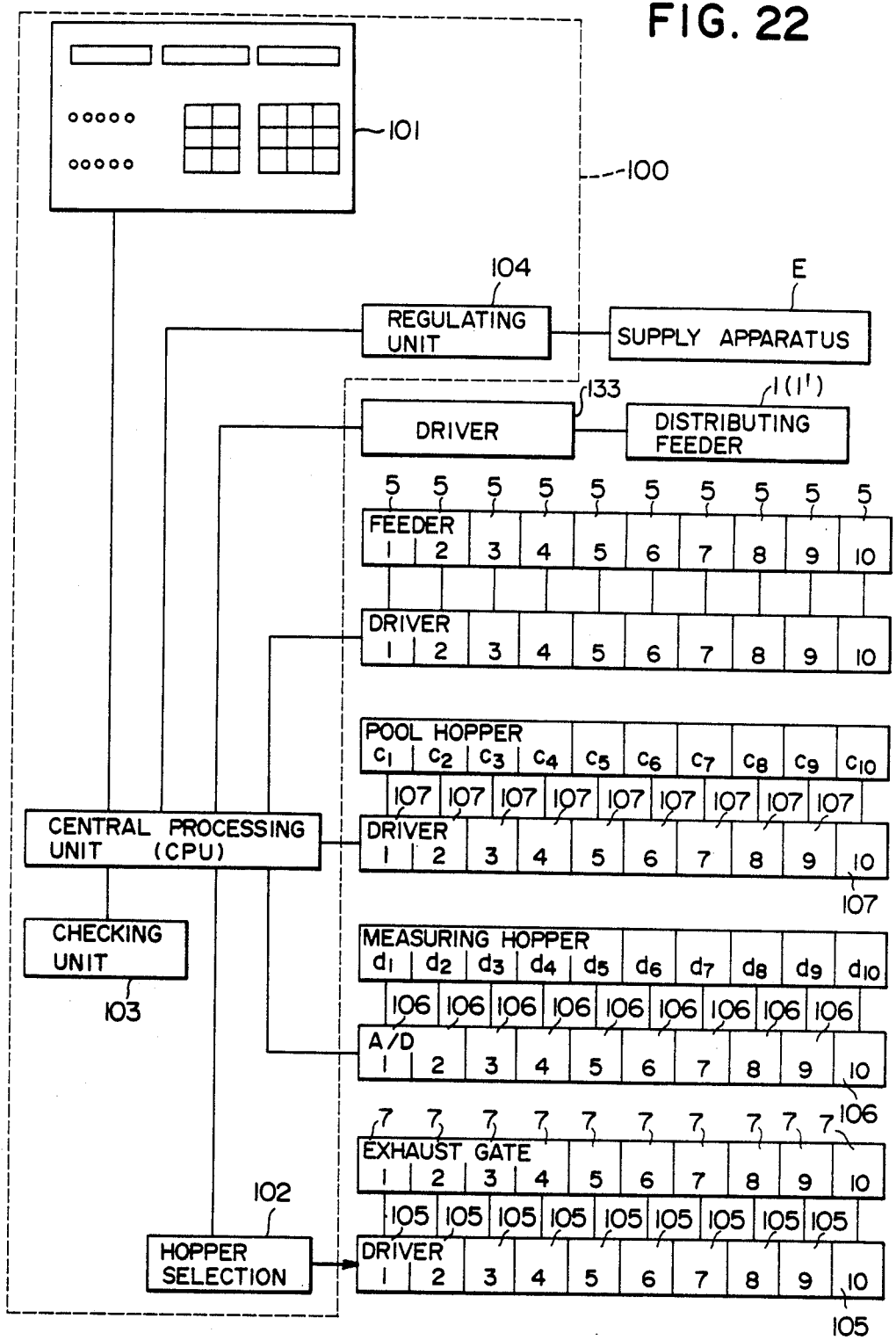
FIG. 22 is a block diagram for explaining the supply apparatus for the product to be measured.
Figure 23:
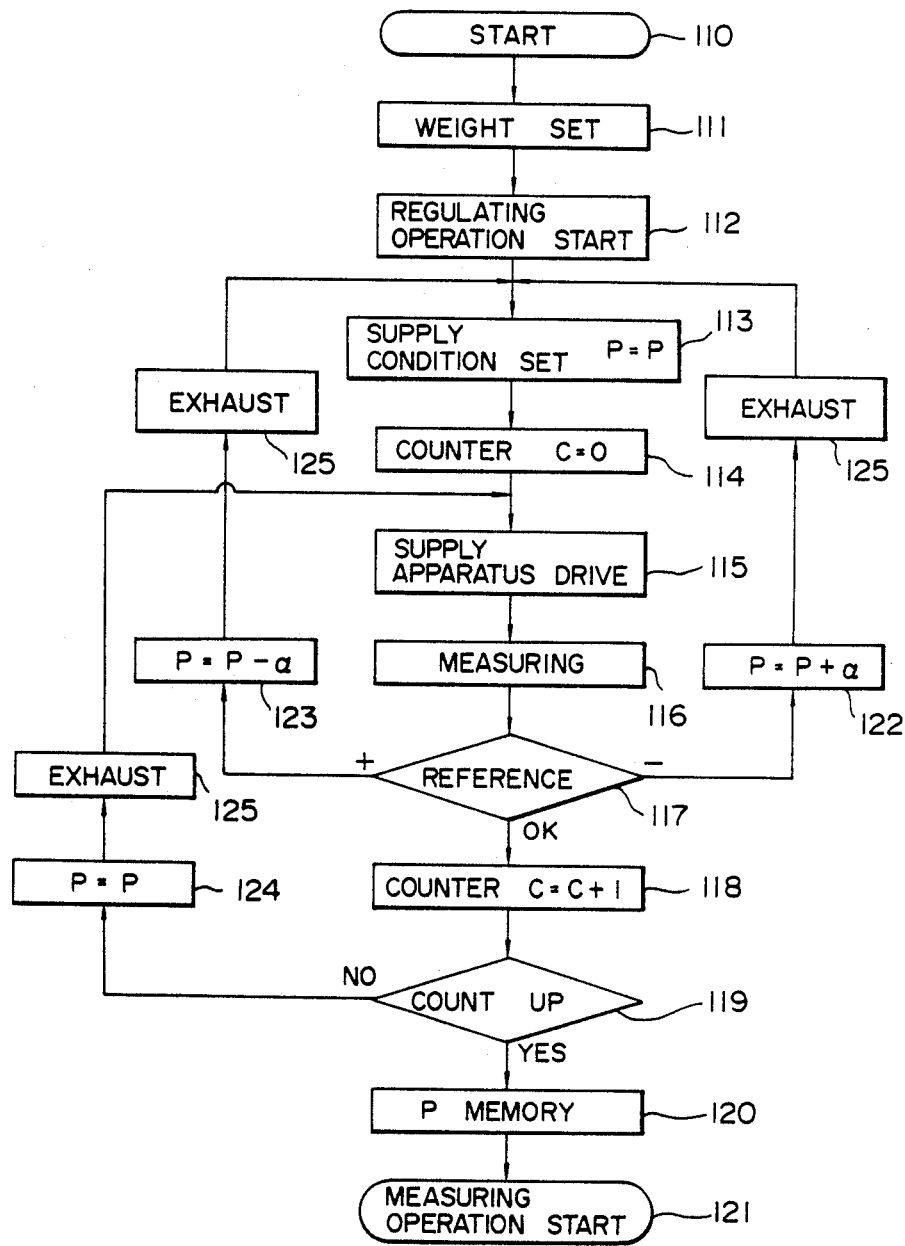
FIG. 23 is a flow chart illustrating a procedure for regulating the supply condition of the product to be measured.

FIGS. 22 and 23 explain the control of the operation of the supply apparatus E shown in FIG. 7, that is, they explain an automatic regulation of the stored amount of the product on the distribution table A. Specifically, FIG. 22 is a block diagram explaining the measured product supply apparatus, and FIG. 23 is a flow chart showing the procedure for controlling the conditions for supplying the product.

The supplied amount of the measured product in the supply apparatus E varies depending on the amplitude and the number of the vibrations of the supply feeder 19 provided in the supply machine 17, the feeding speed of the bucket conveyor 14 and so on. These factors, therefore determine the supply amount, i.e. the amount stored on the distributing table A.

In the block diagram of the regulating mechanism shown in FIG. 22, a control device 100 includes an input unit 101, a hopper selection unit 102, a supply condition checking unit 103 and supply condition regulating unit 104 which are connected to a central processing unit (CPU).

The input unit 101 comprises an input regulating unit, indicators for set weights and the like, indicating lights for indicating the hoppers to be selected and the like, and serves to input the set weights into the central processing unit (CPU) and feeding conditions and the like into the respective feeders.

The hopper selection unit 102 detects whether selectively combined weights of products in the measuring hoppers $d_1$–$d_{10}$ arithmetically processed in the central processing unit (CPU) are substantially equal to the set weight, and opens the bottom plates 7 of the selected measuring hoppers. The opening and closing mechanisms for the bottom plates 7 include circuits or drivers 105 for driving the respective gates, the drivers being connected to the hopper selection unit 102.

The supply condition checking unit 103 has later described checking references based on set weights for checking weights of the product to be measured in the measuring hoppers $d_1$–$d_{10}$ and feeds the checked weights therein to the later described supply condition regulating unit 104.

The supply condition regulating unit 104 connected to the supply apparatus E, increases or decreases the amount of the product to be supplied according to instructions from the checking unit 103 depending upon the weights of the supplied product. In this case, such an adjustment is accomplished, for example, by adjusting the speed of the transferred pivoted bucket conveyor 14 correspondingly to the excess or insufficient weight with reference to speeds per unit weight of the product to be adjusted previously memorized in the regulating unit 104.

In case of carrying out such an adjustment by the amplitude of the supply feeder 19, the difference between the supplied and set weights is calculated in % and the amplitude is increased or decreased in proportion to the calculated value in %.

The central processing unit (CPU) is connected through an A/D convertor 106 to the measuring hoppers $d_1$–$d_{10}$ to arithemetically process the weights of the product in the respective measuring hoppers $d_1$–$d_{10}$ for combining the respective weights to make the hopper selection unit 102 select a combination of the hoppers. To the central processing unit (CPU) are connected opening and closing mechanisms or drivers 107 for the bottom plates of the pool hoppers $c_1$–$c_{10}$ to supply the product to be measured into empty measuring hoppers and to drive the feeders 5 for empty pool hoppers so as to accommodate the measured product in the pool hoppers.

Checking references for supply conditions of measured product will be explained hereinafter. In case of an example that a set weight is 200 g and four measuring hoppers are to be selected is assumed to obtain the following values with conditions f, g, h and i shown in Table 1 (unit: g).

TABLE 1

| No. of measuring hopper | | Condition | | | | |
|---|---|---|---|---|---|---|
| | ... | f | g | h | i | ... |
| 1 | ... | 50 | 52 | 54 | 56 | ... |
| 2 | ... | 48 | 51 | 53 | 55 | ... |
| 3 | ... | 43 | 45 | 46 | 49 | ... |
| 4 | ... | 47 | 50 | 52 | 53 | ... |
| 5 | ... | 49 | 51 | 53 | 54 | ... |
| 6 | ... | 48 | 50 | 51 | 52 | ... |
| 7 | ... | 46 | 48 | 50 | 53 | ... |
| 8 | ... | 48 | 50 | 51 | 52 | ... |
| 9 | ... | 48 | 49 | 52 | 55 | ... |
| 10 | ... | 47 | 48 | 50 | 51 | ... |

In order to obtain 200 g of the product in the four measuring hoppers, the respective hoppers may include 50 g of the product. First reference is that respective average values of the conditions f, g, h and i are within allowable limits which have been previously determined together with average values of product in the hoppers Nos. 1-10. The average values of the conditions are f=47.4, g=49.4, h=51.2 and i=53, so that if the average value with the first reference is determined as 50±1, the condition g should be selected. As the condition g cannot necessarily be determined to be proper in only one checking operation, it should be determined in a predetermined number of times (for example 3) of measuring as to the condition g.

Another reference may be used, which is based on how many combined weights are within an allowable limit of set weight under the respective conditions f, g, h and i.

An automatic adjustment of the supply condition according to the invention will be explained by referring to a flow chart shown in FIG. 23. First, the apparatus is started by switching on a power source at 110 to set the weight and the number of the hoppers to be selected at 111.

After starting the regulating unit at 112, supply conditions (P: for example, amplitude, number and time of vibration of the feeders) are set automatically or manually at the input unit at 113 to clear a counter in the central processing unit (CPU) to zero at 114.

After the supply apparatus E and measuring means are operated to supply the product into the pool hoppers $C_1$–$C_{10}$, the product is accommodated in the measuring hoppers $d_1$–$d_{10}$ at 115 to measure the product at 116.

After detecting whether the product to be measured fulfils the above mentioned first or second reference at 117, the counter counts one every time at 118, and to determine whether the counted number corresponds to a predetermined number at 119. If the counted number corresponds to the predetermined number, this condition is memorized at 120 and measuring operation is effected at 121. If the counted number is less than the predetermined number, the same supply condition is set at 124 and all the hoppers $d_1$–$d_{10}$ are opened for exhausting the product at 125 to repeat the processes 115, 116, 117, 118 and 119.

In the process 117, if the measured value is minus, the condition is changed up or increased by desired values at 122, but if plus, the condition is changed down or decreased at 123 to exhaust the product to be measured at 125 and to repeat the processes 113, 114, 115, 116 and 117.

In the above embodiment, the regulating operation is effected at the commencement of the measuring operation. The automatic regulation may be effected during the operation, as in the case where it is unable to obtain the combination of the weight.

With the above regulating unit, the product supply condition of the supply apparatus E and transfer condition of the feeding troughs $B_1$ and $B_2$ are rapidly automatically adjusted to make the stored amount of the product on the distributing table A suitable to its distributing condition, and therefore the supply condition can set more properly in comparison with the setting of a condition relied upon an operator's sense.

FIGS. 24–28 illustrate an apparatus for automatically regulating the transfer condition of the feeding troughs $b_1$–$b_{10}$, that is, the driving condition of the feeders 5.

Figure 24:
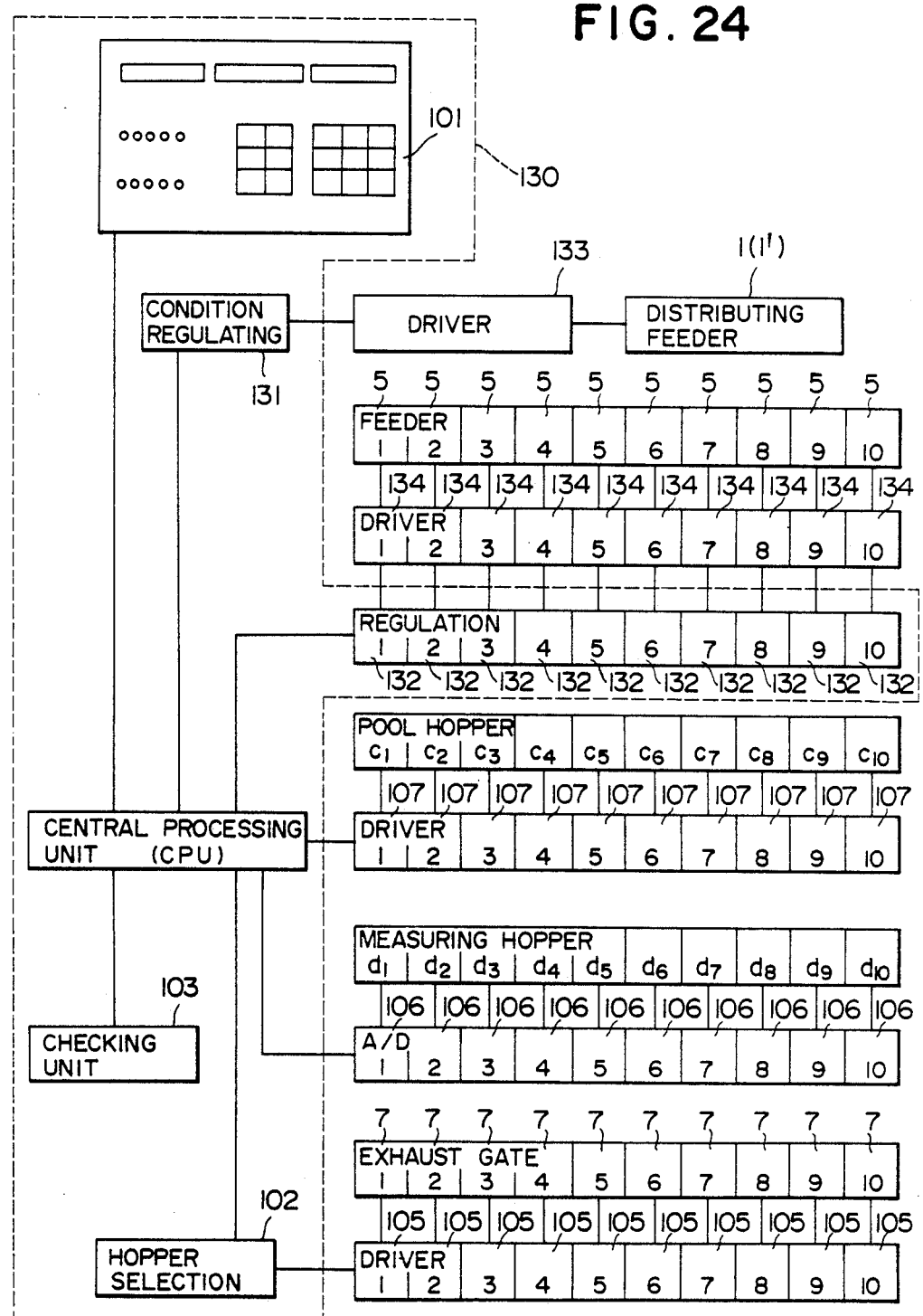
FIG. 24 is a block diagram for explaining a device for regulating transfer conditions of the feeding troughs.

FIG. 24 is principle block diagram of the regulating unit in which the control device 130 includes the input unit 101, the hopper selection unit 102, transfer condition checking unit 103, condition regulating unit 131 of the distributing feeders 1 and 1', condition regulating units 132 of the transfer feeders 5 for the feeding troughs $b_1$–$b_{10}$, these units being connected to the central processing unit (CPU). The set weights of the product, transfer conditions of the feeders 1, 1' and 5 and the like are input into the central processing unit (CPU) by the above input unit 101.

The transfer condition regulating unit 131 is connected to the driving unit or driver 133 of the distributing feeders 1 and 1' and the transfer condition regulating units 132 are connected to the drivers 134 of the feeders 5 to effect the adjustment in the manner of increasing or decreasing the transfer condition in response to the information from the checking unit 103 when the weight is light or heavy.

In adjusting the transfer condition, the transfer time corresponding to the excess or insufficient weight is regulated with the aid of transfer times to be regulated per unit weight of the product previously memorized in the regulating units 132.

In case of an adjustment utilizing amplitudes, the difference between the actual and set weights is calculated in %, the amplitude is increased or decreased in proportion to the calculated percentage.

References for checking the conditions to be set in the supply condition checking unit 103 will be explained hereinafter.

The first reference is whether the measured values of the product in the measuring hoppers $d_1$–$d_{10}$ are within a set weight value (for example 50 g per one hopper).

The second reference is a modification of the first reference in which the measured values of the measuring hoppers $d_1$–$d_{10}$ are on the plus side of the set weight value and the measured values of the remaining measuring hoppers are on the minus side of the set weight value to facilitate the combination of weights.

The procedure with the reference will be explained by referring to the Table 1.

(1) The condition f is set with respect to a set weight of the product.

(2) The measured values of the product in the measuring hoppers $d_1$–$d_{10}$ are arithmetically processed and memorized.

(3) The measured values of the product in the measuring hoppers $d_1$–$d_{10}$ are compared with the set value (50 g per one hopper). The measured value in the measuring hopper $d_1$ is acceptable.

(4) The measured value in the measuring hopper $d_2$ is minus, so that the condition f is changed up to condition g.

(5) The measured values in the measuring hoppers $d_1$–$d_{10}$ with the condition g are arithmetically processed and memorized.

(6) The measured values in the measuring hoppers $d_2$–$d_{10}$ are compared with the set value (50 g per one hopper). The measured values in the measuring hoppers $d_2$, $d_4$, $d_5$, $d_6$ and $d_8$ are acceptable.

(7) The measured value in the measuring hopper $d_3$ is minus, so that the condition g is changed to condition h.

(8) The measured values in the measuring hoppers $d_1$–$d_{10}$ with the condition h are arithmetically processed and memorized.

the set weight and the number of the hoppers to be combined at 141.

After the regulating operation at 142, the transfer conditions (for example, amplitude, number and time of vibration of the feeders) are set automatically or manually from the input unit at 143.

After the feeders 5 are actuated at 144 to accommodate the product in the pool hoppers $c_1$–$c_{10}$ so as to be measured at 145.

After the measured values in the measuring hoppers $d_1$–$d_{10}$ are memorized at 146 as indicated in Table 1, the measured weights are compared with each other at 147 and the conditions are adjusted at 149 and 151, the measured product is exhausted at 150.

Again, the processes 143, 144, 145, 146 and 147 are repeated to select the optimum conditions of the respective feeders 5 so as to start the measuring operation at 148.

Figure 26:
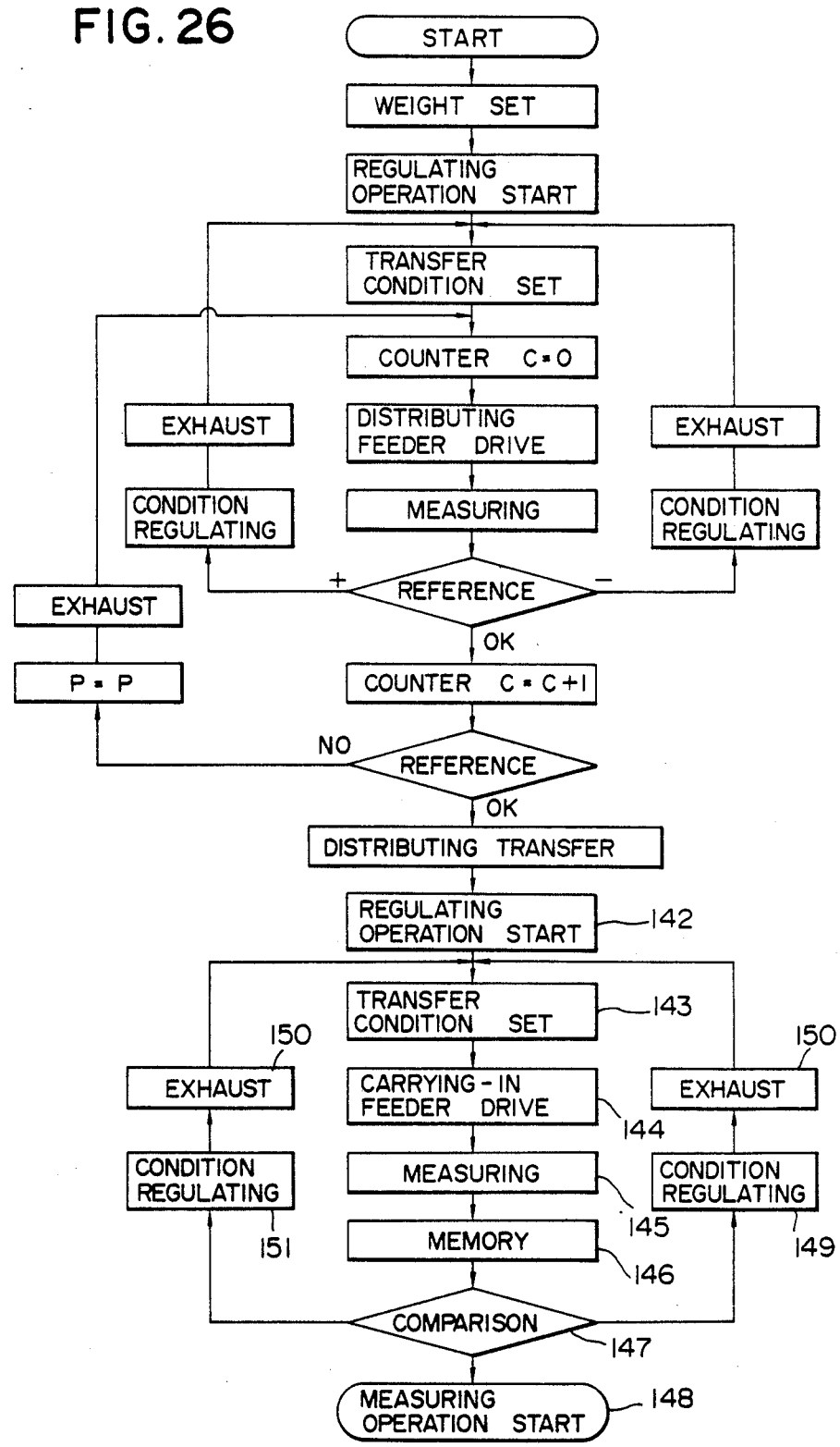

As shown in FIG. 26, moreover, before the transfer conditions of the carrying-in feeders 5 are regulated, the transfer conditions of the distributing feeders 1 and 1' are preferably set. This regulation of the distributing feeders 1 and 1' has for its object to regulate the transfer condition by detecting whether the measured values with the transfer condition fulfil the predetermined value a required number of times of measuring.

One example of the automatic regulation of the transfer condition in the measuring operation will be explained hereinafter.

TABLE 2

| Measuring hopper No. | Weight Condition | less than 45 g | more than 45 g less than 47 g | more than 47 g less than 49 g | more than 49 g less than 51 g | more than 51 g less than 53 g | more than 53 g less than 55 g | more than 55 g |
|---|---|---|---|---|---|---|---|---|
| 1 | f | 0 | 1 | 4 | 6 | 4 | 3 | 2 |
| 2 | g | 2 | 5 | 4 | 3 | 2 | 2 | 2 |
| 3 | i | . | . | . | . | . | . | . |
| 4 | g | . | . | . | . | . | . | . |
| 5 | g | . | . | . | . | . | . | . |
| 6 | g | . | . | . | . | . | . | . |
| 7 | h | . | . | . | . | . | . | . |
| 8 | g | . | . | . | . | . | . | . |
| 9 | g | . | . | . | . | . | . | . |
| 10 | h | . | . | . | . | . | . | . |

(9) The measured values in the measuring hoppers $d_3$, $d_7$, $d_9$ and $d_{10}$ are compared with the set value. The measured values in the measuring hoppers $d_7$, $d_9$ and $d_{10}$ are acceptable.

(10) The condition h is changed to condition i.

(11) The measured values in the measuring hoppers $d_1$–$d_{10}$ with the condition i are arithmetically processed and memorized.

(12) The measured value in the measuring hopper $d_3$ is compared with the set value. It is acceptable.

In the above procedure, the following conditions are set.

Measuring hoppers $d_1$ ... f ... 50 g, $d_6$ ... g ... 50 g $d_2$ ... g ... 51 g, $d_7$ ... h ... 50 g $d_3$ ... i ... 50 g, $d_8$ ... g ... 50 g $d_4$ ... g ... 50 g, $d_9$ ... g ... 49 g $d_5$ ... g ... 51 g, $d_{10}$ ... h ... 50 g In the above case, as the hoppers on the plus side are two, $d_2$ and $d_5$, and on the minus side is one, $d_9$ so that the measuring hopper $d_{10}$ ... g ... 48 g may be set.

Figure 25:
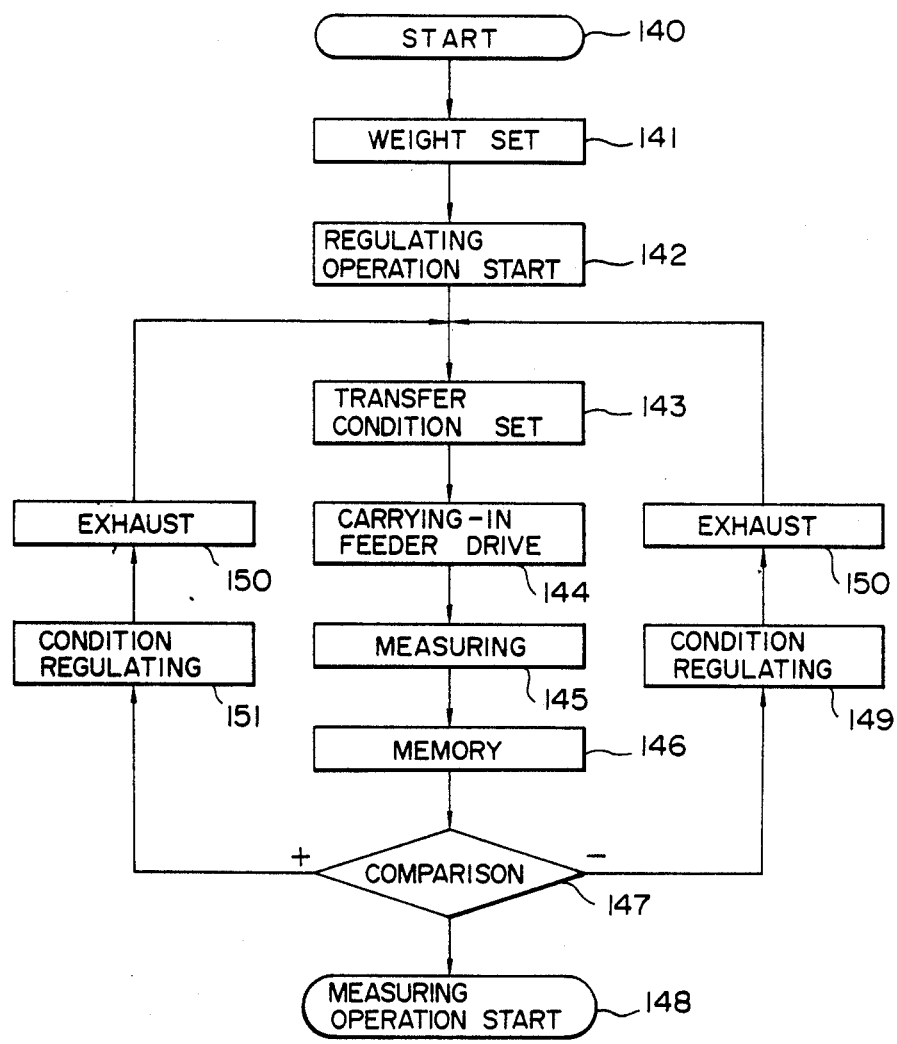
FIGS. 25, 26 and 29 are flow charts illustrating the procedure for regulating the transfer conditions.

Next, the automatic adjustment of the transfer condition will be explained by referring to the flow chart shown in FIG. 25 hereinafter. The apparatus is started by switching on the power source at 140 to input and set When a determined number, for example, 20 times of measuring in the respective measuring hoppers $d_1$–$d_{10}$ are effected, the measured values are summarized and memorized in the manner shown in Table 2. The measured values in for example the measuring hoppers $d_1$ and $d_2$ are indicated by histograms in FIGS. 27 and 28, wherein the most frequent values are 49–51 g and 45–47 g. It is clear that the transfer condition f of the measuring hopper $d_1$ need not be changed, but the condition g of the hopper $d_2$ must be changed up. After this fact is communicated to the regulating unit 132 and the condition of the feeder 5 is changed up, the memorized Table 2 is cleared to summarize new measured values.

Figure 29:
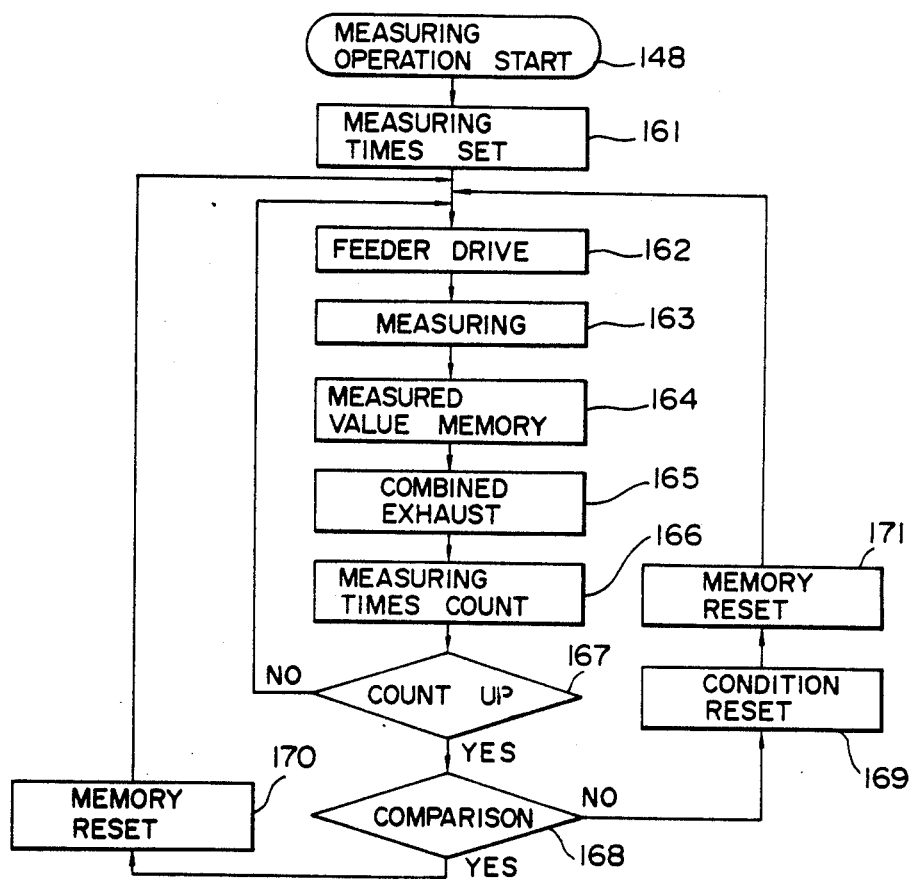

Referring to a flow chart in FIG. 29 for explaining the above automatic regulation, at the same time when the measuring operation starts at 148, the number of times of measuring as a reference is input from the input unit 101 at 161.

The feeders 5 are actuated to accommodate the product through the pool hoppers $c_1$–$c_{10}$ into the measuring hoppers $d_1$–$d_{10}$ at 162, and thereafter the product is measured and its values are arithmetically processed at 163 and memorized at 164, while combined measuring hoppers are opened to exhaust the measured product at 165.

Counters provided at the respective hoppers $d_1$–$d_{10}$ count the numbers of times of the measuring at 166 to judge whether the numbers correspond to the set number at 167.

Figure 27:
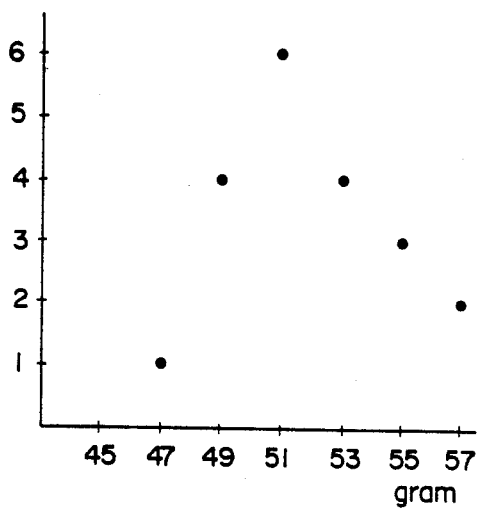
FIGS. 27 and 28 are histograms of Table 2 described in the specification.
Figure 28:
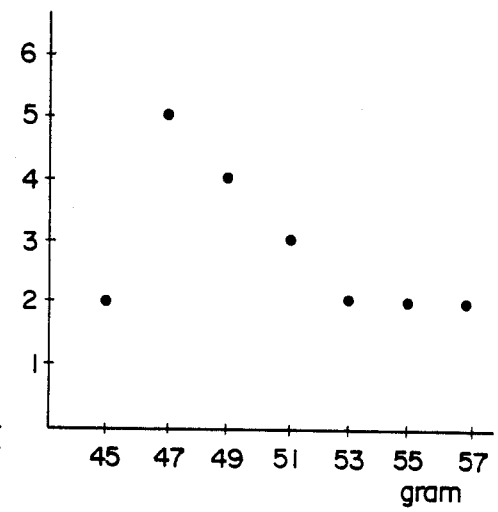

If the counted members are not counted up to the set number, the processes 162, 163, 164, 165 and 166 are repeated. On the other hand, the counted numbers are counted up, the most frequent values as shown in the histograms in FIGS. 27 and 28 are obtained which are then compared with the set value at 168.

If the frequent values are equal to the set value, the memory of the summarized measured values is cleared to reset at 170. If it is not equal, conditions are reset at 169 and the memory is reset at 171.

In the above embodiment, moreover, if the initial conditions are not properly set, some of the measuring hoppers are hardly used, with the result that the required number of times of measuring of some hoppers is not accomplished. Accordingly, if there are hoppers which are not used in ten times of measuring, it is more effective that such hoppers are forcedly excluded to change the conditions suitably.

Figure 30:
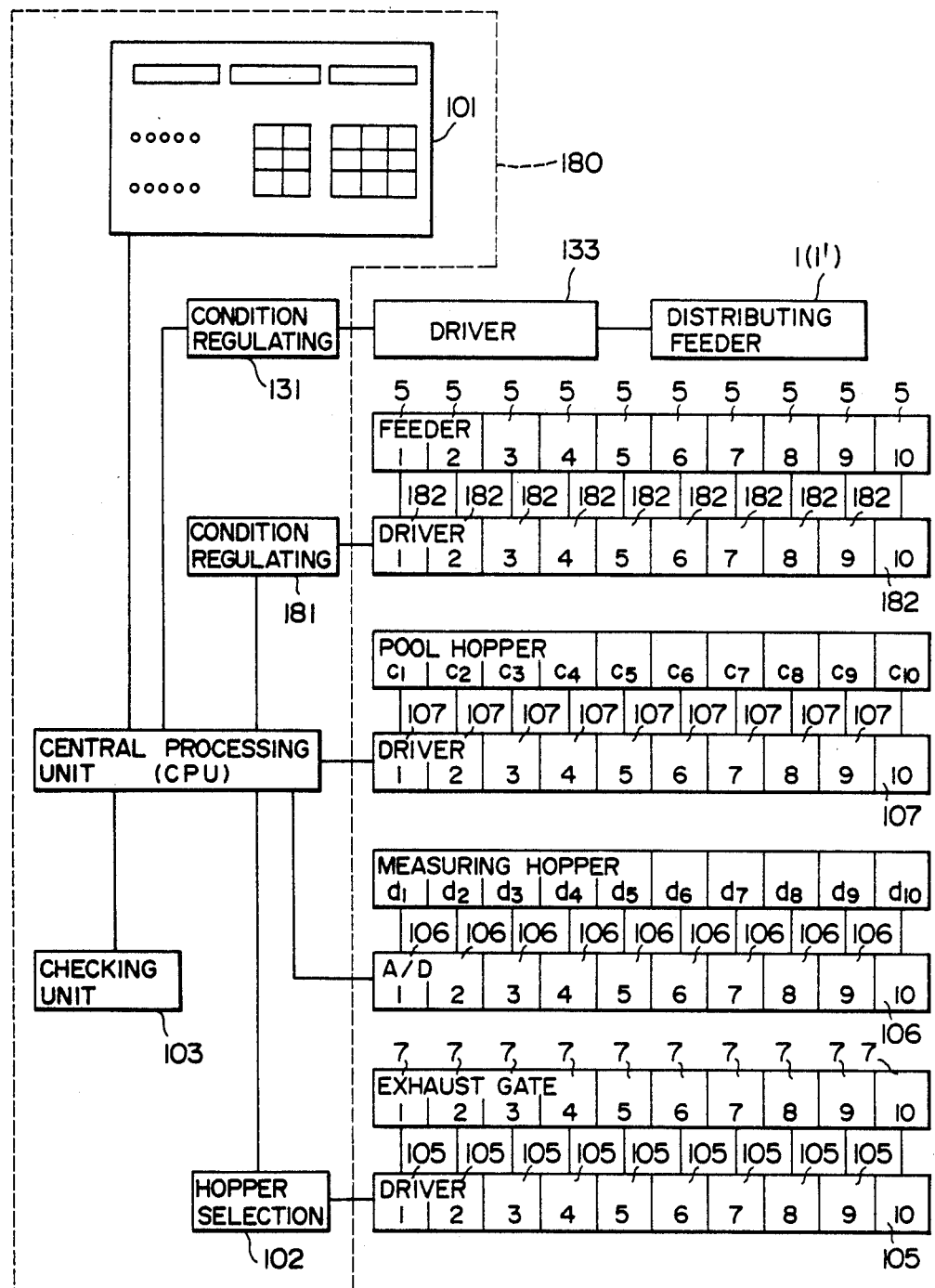
FIG. 30 is a block diagram for explaining a device for regulating transfer conditions of the distributing table and feeding troughs.
Figure 31:
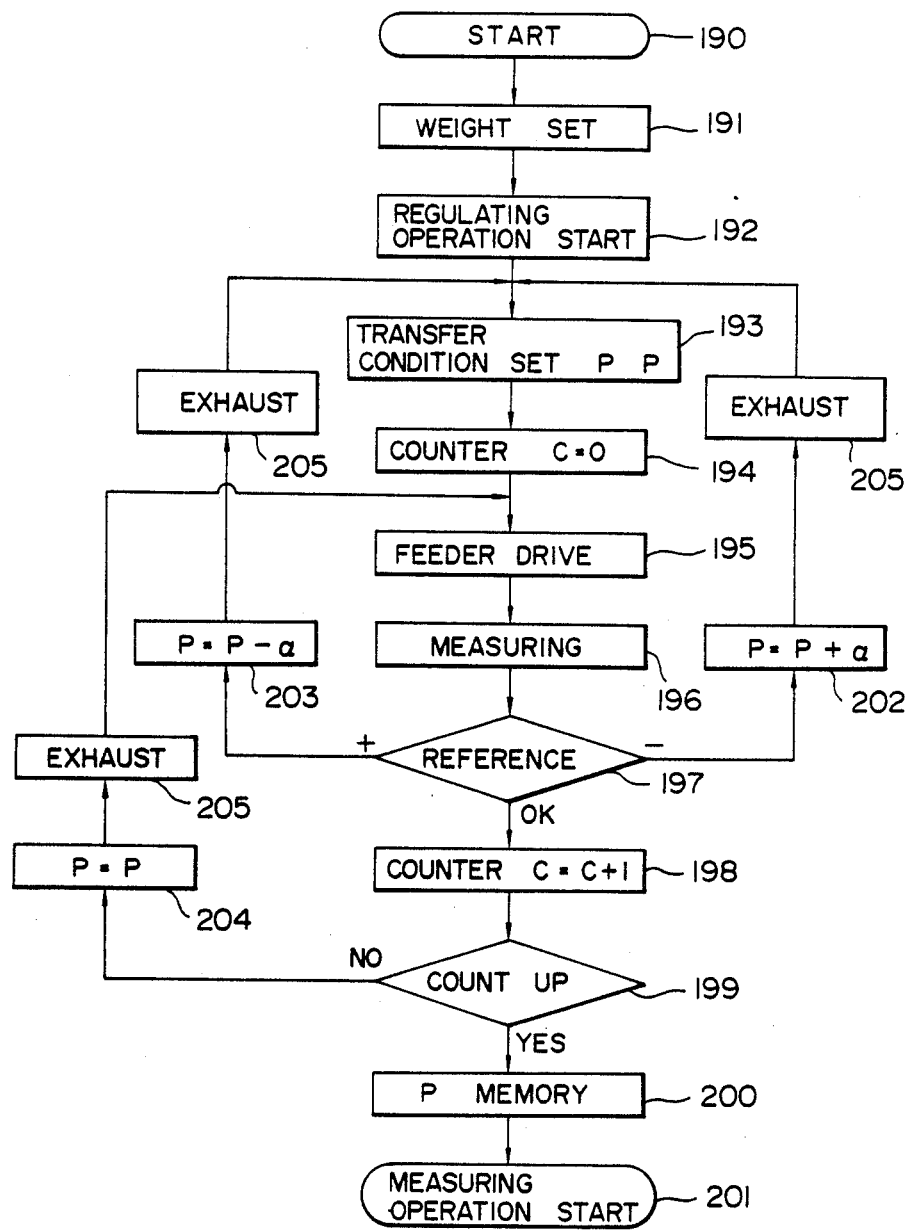
FIGS. 31 and 32 are flow charts illustrating the procedure of the regulation in FIG. 30.
Figure 32:
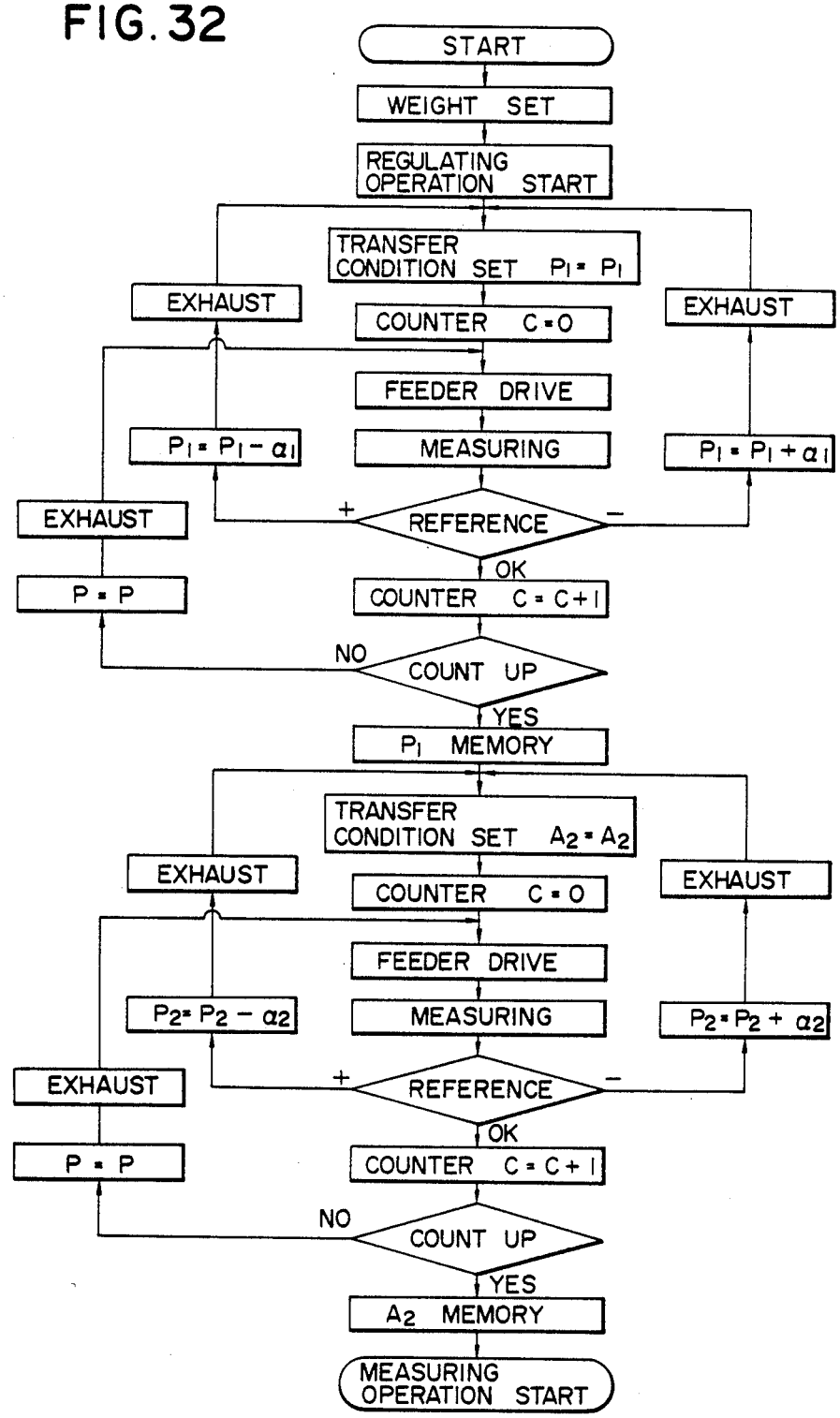

FIGS. 30–32 illustrate a modification of the embodiment shown in the block diagram in FIG. 24. A control device 180 comprises an input unit 101, a hopper selection unit 102, a transfer condition checking unit 103, a condition regulating unit 131 for distributing feeders 1 and 1', a condition regulating unit 181 for transfer feeders 5 and a central processing unit (CPU). The control device 180 is substantially the same as the device shown in FIG. 24 with the exception that the condition regulating unit 181 regulates all the drivers 182 of the feeders 5 as a unitary driver unit. Accordingly, the same parts as those in the previous embodiment will not be explained.

Checking references to be set in the checking unit 103 are as follows.

The first reference is that the respective average values of the conditions f, g, h and i are within allowable limits in case that average values and allowable values in the measuring hoppers $d_1$–$d_{10}$ are predetermined.

The second reference is the standard deviation values predetermined referring to irregularities in conditions f, g, h and i in addition to the first reference. Namely, although the average values are within the allowable limits, if the standard deviation values are large or respective values are distributed in wide ranges, the transfer conditions are readjusted. This is particularly advantageous for the feeding troughs.

Assuming that the average values of the respective conditions are f=47.4, g=49.4, h=51.2 and i=53 and the average value is 50±1 with the first reference, the condition g is selected. It cannot be necessarily determined that the condition g is proper in only one checking. Accordingly, a predetermined number (for example 3) of times of measuring with the condition g is predetermined to detect whether the condition g fulfils the reference the predetermined number of times.

The third reference is that how many combined weights with the conditions f, g, h and i are within the allowable limits of the set weight.

Referring to a flow chart shown in FIG. 31 for explaining the automatic regulation of the transfer condition, the apparatus is started by switching on the power source at 190 to set the weights and the number of hoppers to be combined at 191.

After the regulating unit is then started at 192, the transfer conditions (P: for example, amplitude, number and time of vibration of the feeders) are set automatically or manually from the input unit at 193 and the counter in the central processing unit (CPU) is set to zero at 194.

After the transfer feeders 5 are actuated to accommodate the product in the pool hoppers $c_1$–$c_{10}$, the product is accommodated in the measuring hoppers $d_1$–$d_{10}$ at 195 to effect the measurement at 196.

Any one of the first, second and third references is used to judge whether the weights of the product fulfil the reference at 197. If the weight fulfils the reference, the counter counts one at 198 to judge whether the number of repeated conditions fulfiling the reference corresponds to a predetermined number at 199. If it fulfils the predetermined number, the conditions are memorized at 200 and the combining operation is effected at 201.

If it does not fulfil the predetermined number, after the same transfer conditions are set at 204, all the hoppers $d_1$–$d_{10}$ are opened to exhaust the product at 205 and the processes 195, 196, 197, 198 and 199 are repeated.

When the measured values are minus at 197, the conditions are changed up at 202. If they are plus at 197, the conditions are changed down at 203 to exhaust the measured product at 205 and to repeat the processes 193, 194, 195, 196 and 197.

The set of the transfer condition P in the above flow chart is effected at any one of the distributing feeders 1 and 1' and the transfer feeders 5. In case that both the transfer conditions of both the feeders 1, 1', an 5 are regulated, the processes of the distributing plates and transfer troughs in the above flow chart are repeatedly carried out (FIG. 32).

In the above embodiment, the regulating operation is effected at the commencement of the combining operation. However, it may be effected during operation, for example, in the event that any combination cannot be obtained.

Figure 33:
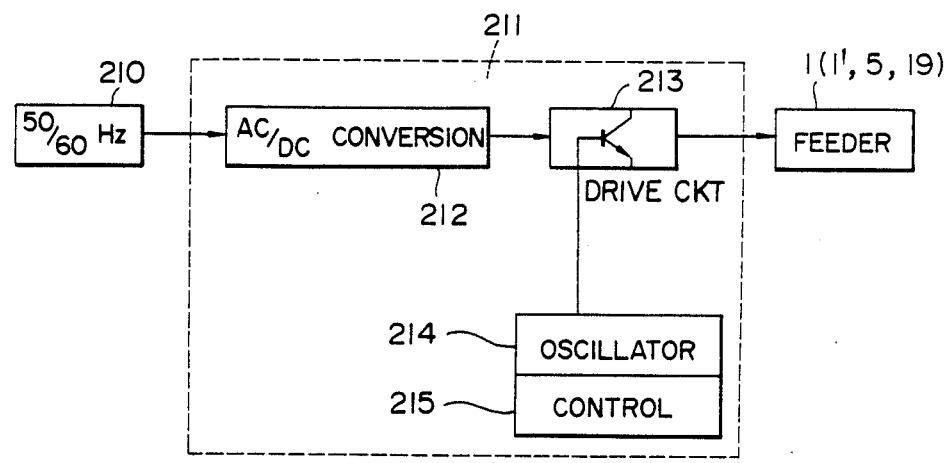
FIG. 33 is a block diagram illustrating driving means of transfer feeders for the distributing table and feeding troughs.
Figure 34:
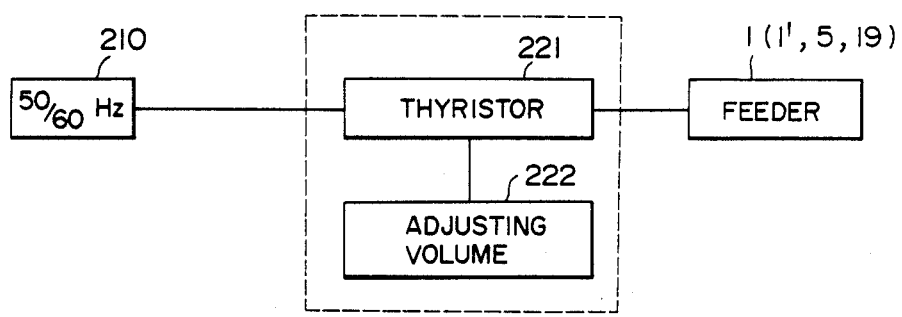
FIG. 34 is a block diagram of prior art driving means.

FIG. 33 illustrates an improved construction of the above mentioned driving means for the distributing feeders 1, 1' 5 and 19. As shown in FIG. 34, the feeder driving means in general uses the commercial electric power 210 rectified at a thyristor 221 whose phase is set at an adjusting volume 222 to adjust vibrations of the feeders 1, 1', 5 and 9.

The above driving means exhibits different transferring performance with the respective commercial electric power of 50 Hz and 60 Hz, so that leaf springs having different tensile forces of the transfer feeders for 50 Hz and 60 Hz should be prepared.

Accordingly, such transfer feeders are expensive in manufacture without realizing the advantage of massproduction because of two cases for 50 Hz and 60 Hz and are troublesome to maintain because of the need for two kinds of parts for maintenance.

Moreover, the driving means using the rectified commercial power cannot be adopted for the changed frequency, so that it cannot set the optimum transfer conditions for various products to be measured, and operates with low efficiency. The transfer conditions are generally different for products as follows.

Powdered materials . . . small amplitude and high frequency

Heavy materials . . . large amplitude and low frequency

FIG. 33 illustrates driving means which eliminates the above disadvantages and includes a vibrator magnet 29 and a movable element 29' adapted to be vertically moved reciprocatively by driving the vibrator magnet 29 by means of a later mentioned driving device.

Referring to FIG. 33, the driving means 211 according to the invention comprises a rectification circuit 212, a drive circuit 213 and an oscillator 214 with a control 215.

The rectification circuit 212 is connected to a commercial power source 210 for converting the current into direct current in a manner that after the commercial current of 50 Hz or 60 Hz is rectified, it is caused to pass through a low-pass filter.

The oscillator 214 generates the peak values and frequency set in the control 215 whose wave forms may be any one of sine, saw tooth and square wave forms.

The drive circuit 213 amplifies the wave forms emitted from the oscillator 214 so as to permit the feeders 1, 1', 5 and 19 to be driven.

The driving means 211 according to the invention can be used with 50 Hz and 60 Hz because the commercial current is converted into direct current. Moreover, it is possible to set the peak values and frequency of the oscillator 214 at will to change the transfer conditions depending upon the kinds of the product to be measured, thereby enabling products within the wide range in weight, size and the like to be transferred with high efficiency.

Figure 35:
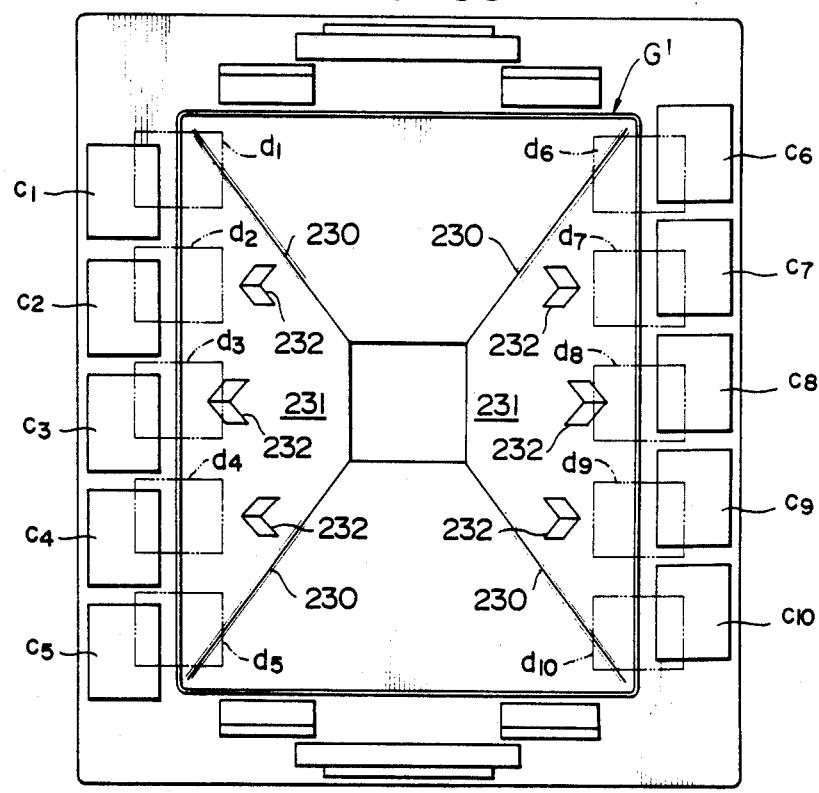
FIG. 35 is a plan view of a lower part of the measuring apparatus including improved collecting hopper.
Figure 36:
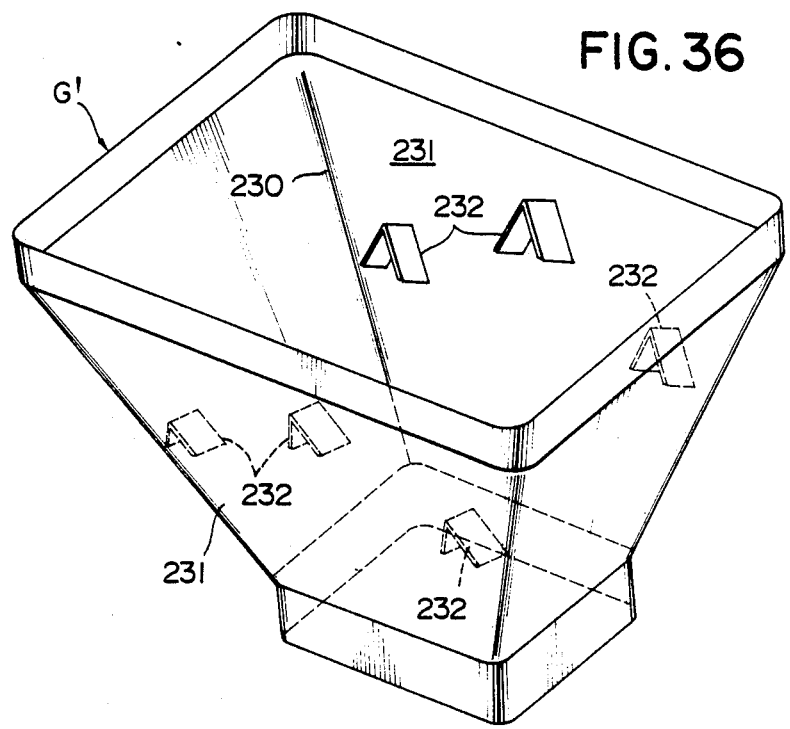
FIG. 36 is a perspective view of the collecting hopper shown in FIG. 35.
Figure 37:
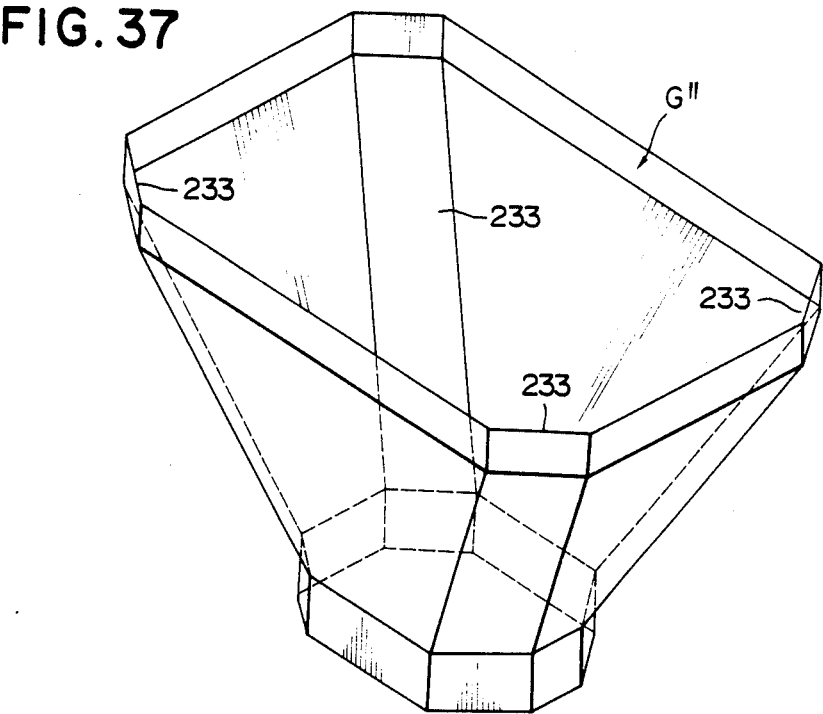
FIG. 37 is a perspective view illustrating a modification of the collecting hopper.
Figure 38:
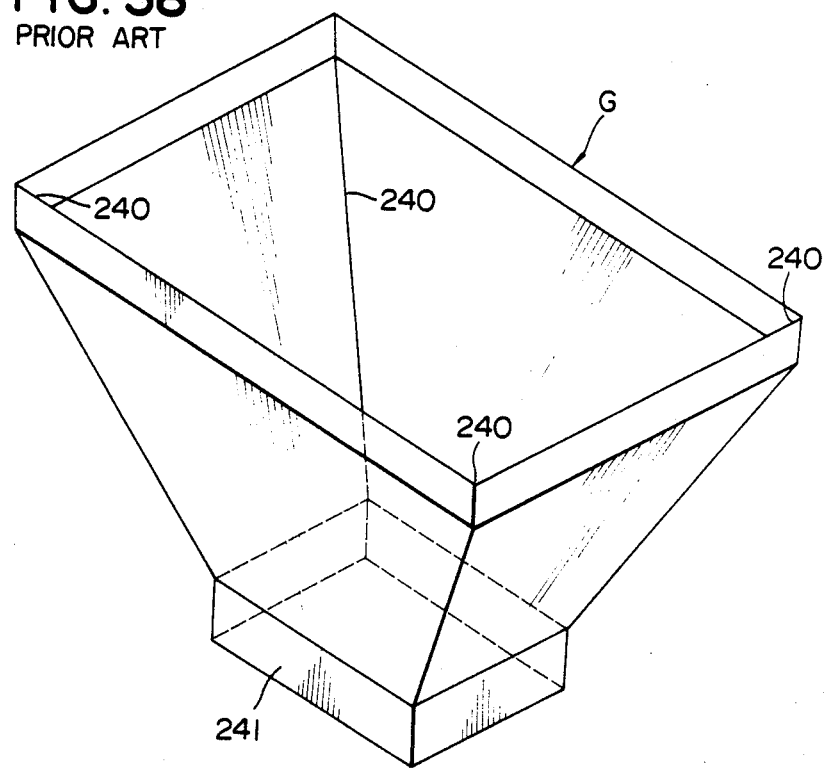
FIG. 38 is a perspective view of a collecting hopper prior to its improvement.

FIGS. 35-37 illustrate an improved collecting hopper G. The collecting hopper G shown in FIG. 4 is in the form of a funnel whose opening is rectangular as shown in FIG. 38. With such a hopper G, the product to be measured collecting at four corners 240 would fall along the corners in rows to elongate their respective falling distances to the exhaust port 241 which require long periods of time for falling. On the other hand, the falling time at the center of the funnel is comparatively short. Accordingly, the time for falling of the product in the respective collecting hoppers is considerably different.

Figure 39:
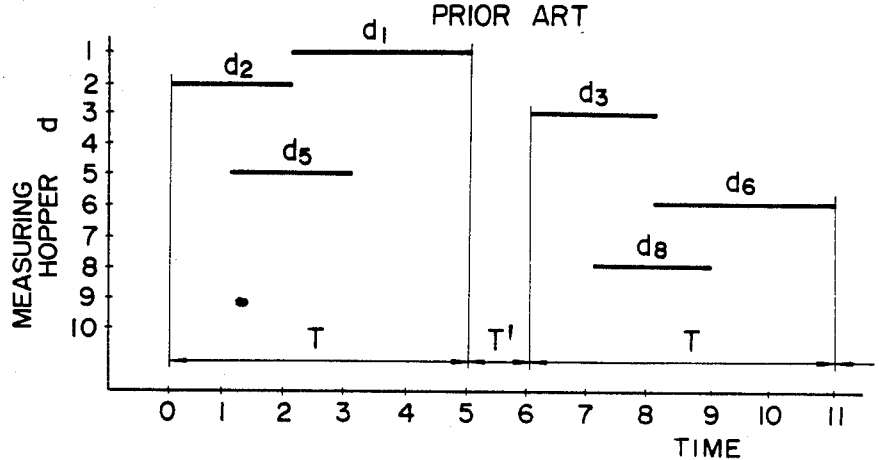
FIG. 39 is a graph illustrating the opening and closing timing of the hopper shown in FIG. 38.

The ordinate in FIG. 39 illustrates the respective measuring hoppers $d_1-d_{10}$ and the abscissa shows the time until the products in the respective measuring hoppers reach the exhaust ports. In the event that the measuring hopper $d_1$, $d_2$ and $d_5$ have been selected at the initial combination selection, the product in the measuring hoppers $d_2$ first reaches the exhaust opening 241 (time 0), and all the product reaches the opening at time 2. The product in the measuring hopper $d_5$ reaches its opening between time 1-3 and in hopper $d_1$ between time 2-5.

Namely, the time 0-5 is required from the time when the initially combined product starts to reach the exhaust opening to the time when all the product reaches the opening. During the required time T, the bottom plate 30 (FIG. 4) at the exhaust opening 241 (FIG. 38) is kept closed. During the internal T' until the next combined product starts to be collected, the bottom plate 30 is opened to exhaust the product and agains closed. In the selection of the next combination of product, the measuring hoppers $d_3$, $d_6$ and $d_8$ are selected, and the product flow in the combined hoppers proceeds in the same manner as above described.

As above described, the bottom plate of the exhaust opening 241 is kept closed during the reaching time T and is opened during the interval T' to exhaust the product. However, as the interval T' is usually too short, the opening and closing timing of the bottom plate is very critical to cause a risk of mixing the exhausted product with the later exhausted product. If the cycle interval for selecting the combination is elongated in order to lengthen the interval T', the combination exhaust efficiency is considerably lower.

Figure 40:
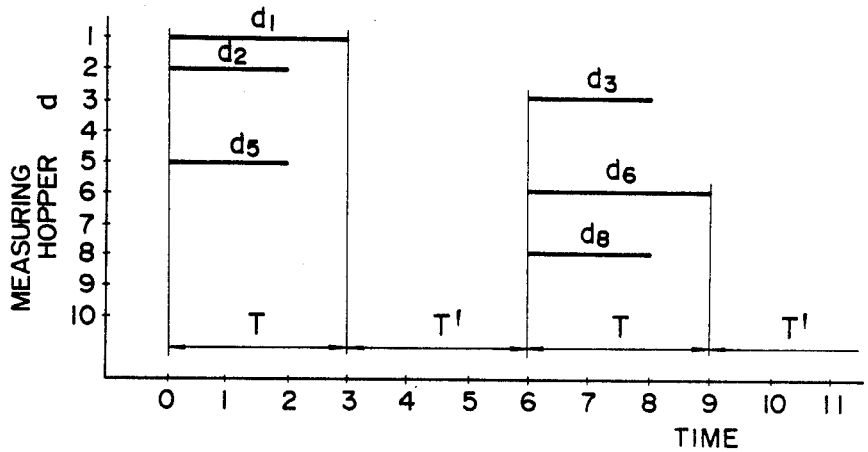
FIGS. 40 and 41 are graphs showing the opening and closing timing of the hoppers shown in FIGS. 36 and 37.
Figure 41:
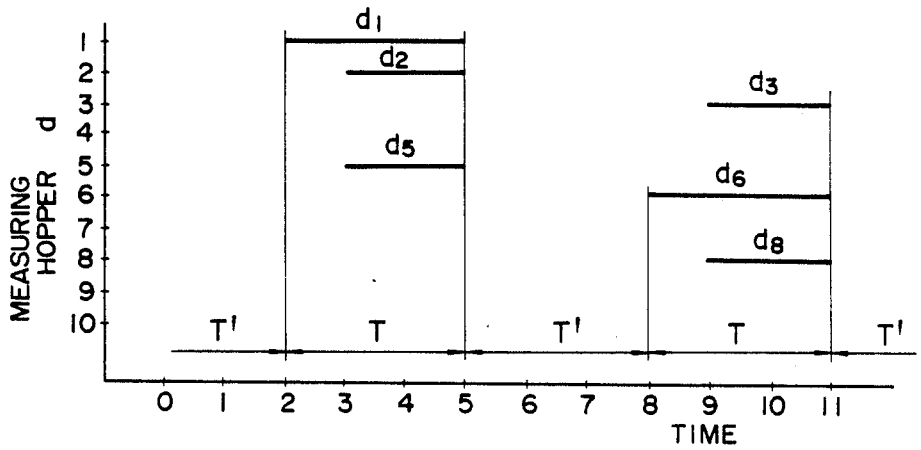

In order to elongate the interval T' in another manner, the time for which the product in each measuring hopper reaches the exhaust port 241 may be made substantially equal to each other. For example, as shown in FIG. 40, the falling time with the measuring hoppers $d_1$ and $d_5$ which is comparatively long is shortened to make uniform the product falling time within the hoppers. Thus the reaching time with the measuring hoppers $d_1$, $d_2$ and $d_5$ overlaps to shorten the entire interval T so as to elongate the interval T'. In the similar manner, the interval T can be elongated by elongating the falling time with the measuring hoppers $d_2$ and $d_5$ which is comparatively short.

The collecting hoppers G' and G" shown in FIGS. 35-37 can make uniform the falling time of the product from the measuring hopper to the collecting hopper to eliminate the disadvantages of the hopper G.

The collecting hopper G' has corners 230 somewhat rounded to avoid the excess concentration of the product at the corners and one or more L-shaped baffle plates 232 secured to wall portions where the falling time of the product is comparatively short.

The above baffle plates 232 causes the falling product to be deflected to elongate the falling time, whereby the falling time of the product remote from the corners is made approximate to the falling time of the product falling along the corner 230.

The collecting hopper G" has a construction to accelerate the product falling along the corners 233 by widely chamfering the corners. In other words, the corners are widely distributed to form the hopper G" into an octagon in section.

With the above hopper G", the product falling along the corners 233 are scarcely in rows and does not cause any delay in falling time, whereby all the falling times become uniform.

What is claimed is:

1. A weighing apparatus comprising a distributing table for receiving product to be weighed, feeding troughs mounted around said distributing table to form a plurality of branched passages for the product, pool hoppers and weighing hoppers connected to the respective feeding troughs for transferring said product on said distributing table through said feeding troughs and said pool hoppers into said weighing hoppers, computer means for selecting a combination of a plurality of said weighing hoppers whose total weight of the product is substantially equal to a set weight to open the selected weighing hoppers to exhaust the weighed product, said distributing table comprises a set of two elongated distributing plates respectively transferring said product to be weighed in opposite directions with the aid of vibration, said feeding troughs are arranged at respective outer edges of said distributing plates side by side in the transferring directions of the product and extending perpendicularly to said outer edges in parallel relationship with each other, said pool hoppers and weighing hoppers are continuously arranged at respective exhaust ports of said feeding troughs, collection hoppers are mounted below said distributing table to be adjacent to the lower ends of all said weighing hoppers, each of said pool and weighing hoppers includes a bottom plate, and an opening and closing mechanism for each of said pool and weighing hoppers, a driving shaft mounted in the transfer direction of said product and linked to each said opening and closing mechanisms for timely opening and closing of said bottom plates, means for regulating the fall of product is provided in an inner surface of each of said collecting hoppers for making uniform the falling time of the product from an upper opening to the exhaust port of said collecting hoppers, and said means for regulating includes an L-shaped baffle plate mounted on and extending from an inner surface of a side wall of each said collecting hopper, whereby the falling time of the product impinging against said baffle plate is extended to make uniform the falling time of the products as a whole.

2. A weighing apparatus as set forth in claim 1, wherein said two distributing plates are mounted in parallel whereby the inner longitudinal edges of said plates are in contact with each other and higher than said outer edges of said plate to form a roof-shaped cross-section.

3. A weighing apparatus as set forth in claim 1, wherein said two distributing plates include at their respective transfer ends guide frame plates standing upright from said distributing plates, said guide frame plates being arranged angularly to said transferring directions to guide the product at one of said transfer terminal ends to transfer start end of the other distributing plate.

4. A weighing apparatus as set forth in claim 3, wherein said transfer terminal ends of both the distributing plates are formed with guide floor surfaces for introducing the product to be measured to the transfer start ends of the other distributing plates.

5. A weighing apparatus as set forth in claim 4, wherein each said guide floor surface comprises a first guide surface upwardly inclining from said distributing plate in the transferring direction and a second guide surface connected to said first guide surface and extending toward the inner longitudinal edge of the other distributing plate.

6. A weighing apparatus as set forth in claim 1, wherein each said driving shaft includes cam shafts actuated through respective magnetic clutches, a cam provided on each said cam shaft is linked to each said opening and closing mechanism.

7. A weighing apparatus as set forth in claim 1, wherein each said bottom plate is pivotally secured to each of said pool and weighing hoppers to be opened and closed.

8. A weighing apparatus as set forth in claim 1, wherein said bottom plates of said pool and weighing hoppers and said opening and closing mechanisms are mounted on a frame of said weighing apparatus, and said pool and weighing hoppers are detachably mounted on said frame.

9. A weighing apparatus as set forth in any one of claims 6-8, wherein each said opening and closing mechanism is a toggle-type mechanism.

10. A weighing apparatus as set forth in claim 1, wherein each said feeding trough comprises a reciprocating feeder having an oscillator for transporting the product in said feeding trough, a control device for regulating feeding conditions of each of said reciprocating feeders, said control device comprising an input unit for inputting the set weight and relative data of the weighing apparatus, a hopper selection unit for selecting a combination of said weighing hoppers whose total weight of the product is substantially equal to said set weight, a checking unit for checking whether the feeding conditions of said reciprocating feeders are suitable or not, a regulating unit for regulating said feeding conditions in response to the result of said checking operation of said checking unit, said checking unit operates to check the weight of the product to be weighed which is stored in said weighing hoppers in response to a predetermined reference value, said regulating unit, as the result of said checking operation, operates to adjust feeding conditions of said reciprocating feeders in such a direction that the weight of the product to be weighed which is stored in said weighing hoppers is increased in case that the weighed value is less than said predetermined reference value, and in turn operates to adjust feeding conditions of said reciprocating feeders in such a direction that the weight of the product to be weighed which is stored in said weighing hoppers is decreased in case that the weighed value is higher than said predetermined reference value.

11. A weighing apparatus as set forth in claim 10, wherein said regulating unit separately regulates said feeders through drivers.

12. A weighing apparatus as set forth in claim 1, wherein each of said distributing plates comprises a distributing feeder having an oscillator and each of said feeding troughs includes a reciprocating feeder having an oscillator respectively for actuating said reciprocating feeder to transport said product on and in said distributing plate and feeding trough, and said apparatus further comprises a control device for regulating transfer conditions of said feeding troughs and reciprocating feeders, said control device comprising an input unit for inputting the set weight of said weighing apparatus and transfer conditions, a hopper selection unit for selecting a combination of said weighing hoppers whose total weight of the product is substantially equal to said set weight, a checking unit for checking whether said transfer conditions are suitable or not, and a regulating unit for regulating said transfer conditions in response to the result of said checking unit, said checking unit operates to check the weight of the product which weight is stored in said weighing hoppers in response to a predetermined reference value, said regulating unit, as the result of said checking operation, operates to adjust said transfer conditions in such a direction that the weight of the product stored in said weighing hoppers is increased in case that said weight value is less than said reference value, and in turn operates to adjust said transfer conditions in such a direction that the weight of the product stored in said weighing hoppers is decreased in case that said weight value is higher than said reference value.

13. A weighing apparatus as set forth in any one of claims 10, 11 or 12 further comprising a drive circuit for reciprocating said reciprocating feeders and a rectifier circuit for supplying dc power to said drive circuit from ac power mains.

14. A weighing apparatus as set forth in claim 1, further comprising a means for supplying the product from a product supply apparatus, comprising a supply hopper, to said distributing table, said supply hopper being provided with exhaust ports bifurcated in said transferring direction and being further provided with a valve for setting the amount of the product delivered to said distributing table, sensors respectively located in the proximity of said exhaust ports of said supply hopper for automatically causing the opening and closing of said valve by the output of said sensors.

15. A weighing apparatus as set forth in claim 14, wherein each said sensor is an optical sensor having a light emitting element and a light receiving element mounted in confronting relationship, and a plurality of said sensors are arranged one above the other in a multiple stage.

16. A weighing apparatus as set forth in claim 14 further comprising a control device for regulating product supply conditions of said means for supplying, said control device comprising an input unit for inputting at least the set weight of said weighing apparatus, a hopper selection unit for selecting the weighing hoppers whose weight of product is substantially equal to said set weight, a checking unit for checking whether the supply conditions of said means for supplying are suitable or not, and a regulating unit for suitably regulating supply conditions in response to said checking unit.

17. A weighing apparatus as set forth in claim 16, wherein said means for supplying comprises a supply feeder having an oscillator, transfer conditions of said supply feeder being regulated by a control device.

18. A weighing apparatus as set forth in claim 1, wherein the corners of each collecting hopper are widely camfered, thereby eliminating any delay in the falling time of the product falling along said corners to make uniform the falling time of the product as a whole.

19. A weighing apparatus comprising a distributing table for receiving product to be weighed, feeding troughs mounted around the periphery of said distributing table to form a plurality of branched passages for the product, pool hoppers and weighing hoppers connected to the respective feeding troughs for transferring said product on said distributing table through said feeding troughs and said pool hoppers into said weighing hoppers, computer means for selecting a combination of a plurality of said weighing hoppers the total weight of the product therein which is substantially equal to a set weight to open the selected weighing hoppers to exhaust the weighed product therein, said distributing table comprising a set of two elongated vibrating distributing plates respectively transferring said product in opposite directions, and a mounting plate located above each said distributing plate and including at least one control plate adjustable in height and downwardly extending toward an inlet port of said feeding troughs, said control plate regulating the amount of product supplied to said feeding trough, said feeding troughs are mounted at respective outer edges of said distributing plates in side-by-side relationship in the transferring directions of said product and extending perpendicularly to said outer edges of the plates in parallel relationship with one another, said pool hoppers and weighing hoppers are continuously arranged at respective exhaust ports of said feeding troughs, each of said pool and weighing hoppers includes a bottom plate, and an opening and closing mechanism for each of said pool and weighing hoppers.

20. A weighing apparatus as set forth in claim 19, wherein each said control plate is a flexible synthetic thin plate formed in its lower portion with several slits.

* * * * *